(12) United States Patent
Brewster et al.

(10) Patent No.: US 9,776,296 B2
(45) Date of Patent: Oct. 3, 2017

(54) POWER TOOL DUST COLLECTOR

(75) Inventors: Michael R. Brewster, Milwaukee, WI (US); Tsz Kin Wong, Shatin (HK); Chin Hung Lam, Ma On Shan (HK); Brian P. Wattenbach, Menomonee Falls, WI (US); Brandon L. Verbrugge, Brookfield, WI (US); Roland Vögele, Winnenden (DE); Kurt Limberg, Milwaukee, WI (US); Ming Cong Chen, Dongguang (CN)

(73) Assignee: Milwaukee Electric Tool Corporation, Brookfield, WI (US)

( * ) Notice: Subject to any disclaimer, the term of this patent is extended or adjusted under 35 U.S.C. 154(b) by 424 days.

(21) Appl. No.: 13/604,674

(22) Filed: Sep. 6, 2012
(Under 37 CFR 1.47)

(65) Prior Publication Data

US 2013/0213683 A1    Aug. 22, 2013

Related U.S. Application Data

(63) Continuation-in-part of application No. 13/349,784, filed on Jan. 13, 2012, now Pat. No. 8,967,923, and a continuation-in-part of application No. 12/991,753, filed as application No. PCT/US2009/043365 on May 8, 2009, now Pat. No. 8,813,868.

(60) Provisional application No. 61/654,296, filed on Jun. 1, 2012, provisional application No. 61/611,417, filed on Mar. 15, 2012, provisional application No. 61/611,003, filed on Mar. 14, 2012, provisional application No. 61/051,892, filed on May 9, 2008.

(51) Int. Cl.
*B25D 17/14*     (2006.01)
*B23Q 11/00*     (2006.01)

(52) U.S. Cl.
CPC .......... *B23Q 11/00* (2013.01); *B23Q 11/0046* (2013.01); *Y02P 70/171* (2015.11)

(58) Field of Classification Search
CPC . B25B 21/00; B25B 27/10; B25F 5/00; B23B 2220/08; B23B 47/34; B23B 51/103; B22F 2003/247; B23C 2210/04
USPC ....... 173/20, 29, 178, 48, 47, 217, 131, 132, 173/170–171, 198
See application file for complete search history.

(56) References Cited

U.S. PATENT DOCUMENTS 2,041,689 A    5/1936  Baumeister et al.
2,742,105 A    4/1956  Dow
(Continued)

FOREIGN PATENT DOCUMENTS

DE    2925908    1/1981
DE    3202737    8/1983
(Continued)

OTHER PUBLICATIONS

English translation of EP2363237.
(Continued)

*Primary Examiner* — Robert Long
(74) *Attorney, Agent, or Firm* — Michael Best & Friedrich LLP

(57) ABSTRACT

A power tool assembly includes a hand-held power tool, a dust collector removably coupled to the power tool, and first and second power tool battery packs each of which is interchangeably coupled with the power tool and the dust collector for separately powering the power tool and the dust collector, respectively.

59 Claims, 19 Drawing Sheets

(56) References Cited

U.S. PATENT DOCUMENTS

| | | | |
|---|---|---|---|
| 2,829,867 A | 4/1958 | Brochetti | |
| 3,162,255 A | 12/1964 | McCarty | |
| 3,368,633 A | 2/1968 | Moates | |
| 3,456,740 A | 7/1969 | Paule et al. | |
| 3,533,565 A | 10/1970 | Weiner | |
| 3,537,336 A | 11/1970 | Schmuck | |
| 3,776,647 A | 12/1973 | Hart | |
| 3,837,383 A | 9/1974 | Ko | |
| 3,850,254 A | 11/1974 | Hirdes | |
| 3,882,644 A | 5/1975 | Cusumano | |
| 3,934,661 A | 1/1976 | Sauerwein et al. | |
| 3,936,213 A | 2/1976 | Kappel | |
| 3,958,474 A | 5/1976 | Kreitz | |
| 3,964,212 A | 6/1976 | Karden | |
| 4,011,624 A | 3/1977 | Proett | |
| 4,051,880 A | 10/1977 | Hestily | |
| 4,064,952 A | 12/1977 | Lechner | |
| 4,097,176 A | 6/1978 | Wanner et al. | |
| 4,192,390 A | 3/1980 | Wanner et al. | |
| 4,207,953 A | 6/1980 | Reibetanz et al. | |
| 4,209,069 A | 6/1980 | Smith | |
| 4,213,571 A | 7/1980 | Deardorff et al. | |
| 4,250,971 A | 2/1981 | Reibetanz et al. | |
| 4,251,171 A | 2/1981 | Brett | |
| 4,276,675 A | 7/1981 | Pioch | |
| 4,329,095 A | 5/1982 | Schmuck | |
| 4,361,957 A | 12/1982 | Krotz et al. | |
| 4,368,556 A | 1/1983 | Wanner et al. | |
| 4,515,504 A | 5/1985 | Moore, Sr. | |
| D280,142 S | 8/1985 | Pudwill | |
| 4,615,070 A * | 10/1986 | Frederick | E01H 1/0854 15/339 |
| 4,643,776 A * | 2/1987 | Hollowell | E01H 1/0836 134/21 |
| 4,766,639 A | 8/1988 | Lindquist et al. | |
| 4,820,090 A | 4/1989 | Chen | |
| 4,820,315 A | 4/1989 | DeMarco | |
| 4,825,140 A | 4/1989 | St. Louis | |
| 4,881,294 A | 11/1989 | Riedl | |
| D305,607 S | 1/1990 | Andrews | |
| 4,921,375 A | 5/1990 | Famulari | |
| 4,956,892 A * | 9/1990 | Fawkes | A47L 5/24 15/339 |
| 4,964,472 A * | 10/1990 | Cleworth | A01B 1/16 111/7.2 |
| 4,967,516 A | 11/1990 | Hoshino et al. | |
| D316,316 S | 4/1991 | Yuen | |
| 5,025,870 A | 6/1991 | Gantner | |
| 5,061,123 A | 10/1991 | Broussard | |
| 5,084,972 A | 2/1992 | Waugh | |
| 5,089,738 A * | 2/1992 | Bergqvist et al. | 310/50 |
| 5,090,499 A * | 2/1992 | Cuneo | B23Q 11/0046 173/75 |
| 5,099,157 A | 3/1992 | Meyer | |
| 5,120,983 A | 6/1992 | Samann | |
| 5,129,467 A * | 7/1992 | Watanabe et al. | 173/75 |
| 5,136,750 A * | 8/1992 | Takashima | A47L 9/2857 15/319 |
| 5,199,174 A * | 4/1993 | Wild | B23D 59/006 30/123.3 |
| 5,199,501 A | 4/1993 | Kluber et al. | |
| 5,237,896 A | 8/1993 | Albright et al. | |
| 5,256,906 A | 10/1993 | Tsuge et al. | |
| 5,292,210 A | 3/1994 | Nowick | |
| 5,327,649 A | 7/1994 | Skinner | |
| 5,356,245 A | 10/1994 | Hosoi et al. | |
| 5,440,809 A | 8/1995 | Padilla | |
| 5,467,835 A | 11/1995 | Obermeier et al. | |
| 5,509,454 A | 4/1996 | Giacometti | |
| 5,545,082 A | 8/1996 | Courson et al. | |
| 5,606,767 A | 3/1997 | Crlenjak et al. | |
| 5,674,119 A * | 10/1997 | DesRosiers | A61C 13/12 451/344 |
| 5,688,082 A | 11/1997 | Richardson | |
| 5,747,973 A | 5/1998 | Robitaille et al. | |
| 5,765,654 A | 6/1998 | Burger | |
| 5,813,802 A | 9/1998 | Ajimi et al. | |
| 5,878,607 A * | 3/1999 | Nunes | A61F 15/02 30/124 |
| 5,881,823 A | 3/1999 | Kabatnik et al. | |
| 5,899,644 A | 5/1999 | Buck et al. | |
| 5,904,453 A | 5/1999 | Gavia | |
| 5,909,016 A | 6/1999 | Sterling | |
| 5,931,072 A | 8/1999 | Shibata | |
| 5,940,931 A | 8/1999 | Jeon | |
| 5,952,623 A | 9/1999 | Sterling | |
| 5,955,791 A | 9/1999 | Irlander | |
| 5,983,445 A | 11/1999 | Baker | |
| 5,988,954 A | 11/1999 | Gaskin et al. | |
| 5,993,122 A | 11/1999 | Baker | |
| 6,014,811 A | 1/2000 | Taomo et al. | |
| 6,027,399 A | 2/2000 | Stewart | |
| 6,044,519 A | 4/2000 | Hendrix | |
| 6,053,674 A | 4/2000 | Thompson | |
| 6,079,078 A | 6/2000 | Byington | |
| 6,102,631 A | 8/2000 | Nyari | |
| 6,120,363 A * | 9/2000 | Dunn | B24B 23/04 15/22.2 |
| D431,766 S | 10/2000 | Zurwelle | |
| 6,146,066 A | 11/2000 | Yelton | |
| 6,167,626 B1 | 1/2001 | Doumani et al. | |
| 6,222,285 B1 | 4/2001 | Haley et al. | |
| D442,452 S | 5/2001 | Stirm et al. | |
| 6,224,471 B1 | 5/2001 | Clowers et al. | |
| 6,233,831 B1 | 5/2001 | Iida et al. | |
| 6,265,091 B1 * | 7/2001 | Pierson | H01M 2/10 320/104 |
| D447,032 S | 8/2001 | Schoen et al. | |
| 6,379,091 B1 | 4/2002 | Queipo | |
| 6,416,403 B1 | 7/2002 | Chiang | |
| 6,431,040 B1 | 8/2002 | Miller et al. | |
| 6,443,675 B1 | 9/2002 | Kopras et al. | |
| 6,443,676 B1 | 9/2002 | Kopras | |
| 6,457,915 B1 | 10/2002 | Kao | |
| 6,470,778 B1 | 10/2002 | Kaye, Jr. et al. | |
| 6,501,195 B1 | 12/2002 | Barton | |
| 6,501,197 B1 * | 12/2002 | Cornog et al. | 307/150 |
| 6,502,949 B1 * | 1/2003 | Horiyama | B23Q 11/0046 173/217 |
| 6,514,131 B1 | 2/2003 | Reich et al. | |
| 6,528,902 B1 | 3/2003 | Barton | |
| 6,543,549 B1 | 4/2003 | Riedl et al. | |
| 6,557,261 B1 | 5/2003 | Buser et al. | |
| 6,587,184 B2 | 7/2003 | Wursch et al. | |
| 6,595,300 B2 | 7/2003 | Milbourne | |
| 6,609,860 B2 | 8/2003 | Wanek et al. | |
| 6,615,930 B2 * | 9/2003 | Bongers-Ambrosius | B08B 15/04 173/198 |
| 6,640,384 B2 * | 11/2003 | Sanders | A47L 5/14 15/330 |
| 6,641,634 B2 | 11/2003 | Reich et al. | |
| D487,686 S | 3/2004 | Milbourne | |
| 6,749,654 B2 | 6/2004 | Hilliard | |
| 6,776,244 B2 | 8/2004 | Milbourne | |
| D499,946 S | 12/2004 | Stirm | |
| 6,827,640 B2 | 12/2004 | Bures et al. | |
| 6,829,804 B2 | 12/2004 | Sepke | |
| 6,830,507 B2 | 12/2004 | Reich et al. | |
| 6,848,985 B2 | 2/2005 | Lamprecht et al. | |
| 6,851,898 B2 | 2/2005 | Ege et al. | |
| 6,854,937 B1 | 2/2005 | Weiss | |
| 6,854,938 B2 | 2/2005 | Kopras et al. | |
| 6,876,173 B2 * | 4/2005 | Mastaler | H02J 7/0045 320/114 |
| 6,887,146 B2 | 5/2005 | Staas et al. | |
| 6,910,960 B2 | 6/2005 | Reich et al. | |
| D507,950 S | 8/2005 | Aglassinger | |
| D508,388 S | 8/2005 | Aglassinger | |
| 6,951,439 B2 | 10/2005 | Arich | |
| D515,383 S | 2/2006 | Aglassinger | |
| 7,000,709 B2 | 2/2006 | Milbourne | |

(56) References Cited

U.S. PATENT DOCUMENTS

| | | | |
|---|---|---|---|
| 7,014,945 B2 * | 3/2006 | Moores, Jr. | B25F 5/008 429/120 |
| 7,017,680 B2 | 3/2006 | Arich et al. | |
| D518,347 S | 4/2006 | Corcoran | |
| D520,320 S | 5/2006 | Corcoran | |
| 7,047,647 B1 | 5/2006 | Muller et al. | |
| 7,118,607 B2 | 10/2006 | Bott et al. | |
| 7,118,609 B2 | 10/2006 | Valentini | |
| 7,123,462 B2 | 10/2006 | Uekawa | |
| 7,175,371 B2 | 2/2007 | Vidal | |
| 7,182,150 B2 * | 2/2007 | Grossman | B23Q 1/0009 173/171 |
| 7,197,826 B2 | 4/2007 | Baxivanelis et al. | |
| 7,220,088 B2 | 5/2007 | Ferrari et al. | |
| 7,235,006 B2 | 6/2007 | Ikeda et al. | |
| 7,281,886 B2 | 10/2007 | Stoerig | |
| 7,296,323 B2 | 11/2007 | Hayama et al. | |
| 7,300,337 B1 | 11/2007 | Sun et al. | |
| D559,059 S | 1/2008 | Concari | |
| 7,323,023 B2 | 1/2008 | Michele et al. | |
| 7,325,273 B2 | 2/2008 | Thanner et al. | |
| 7,334,969 B2 | 2/2008 | Wood et al. | |
| 7,341,481 B2 | 3/2008 | Spiri et al. | |
| 7,347,651 B2 | 3/2008 | Hintze et al. | |
| 7,354,226 B2 | 4/2008 | Britz | |
| 7,371,034 B2 | 5/2008 | Clark | |
| 7,396,193 B2 | 7/2008 | Kesten | |
| 7,422,040 B2 | 9/2008 | Thomas | |
| 7,425,109 B2 | 9/2008 | Simm et al. | |
| 7,445,655 B2 | 11/2008 | Bock et al. | |
| 7,451,791 B2 * | 11/2008 | Cooper | B25F 5/02 144/136.95 |
| 7,455,486 B2 | 11/2008 | Britz | |
| 7,465,328 B2 | 12/2008 | Trautner et al. | |
| 7,475,739 B2 | 1/2009 | Wuensch | |
| D587,547 S | 3/2009 | Aglassinger | |
| 7,497,886 B2 | 3/2009 | Walker | |
| 7,509,900 B2 | 3/2009 | Young | |
| 7,510,356 B2 | 3/2009 | Colon | |
| D590,225 S | 4/2009 | Sell | |
| 7,526,833 B2 * | 5/2009 | Cochran | A47L 5/14 15/327.2 |
| 7,526,866 B2 | 5/2009 | Schnell et al. | |
| D593,389 S | 6/2009 | Clayton | |
| D593,827 S | 6/2009 | Miller et al. | |
| D594,304 S | 6/2009 | Aglassinger | |
| 7,549,826 B2 | 6/2009 | Videtto | |
| 7,553,217 B2 | 6/2009 | Reich et al. | |
| 7,635,293 B2 | 12/2009 | Sun et al. | |
| 7,644,469 B2 | 1/2010 | Beers et al. | |
| 7,661,195 B1 | 2/2010 | Wood et al. | |
| 7,669,622 B2 | 3/2010 | Liao | |
| D615,838 S | 5/2010 | Aglassinger | |
| D618,529 S | 6/2010 | Stirm | |
| D618,531 S | 6/2010 | Stirm | |
| 7,726,918 B2 | 6/2010 | Onose et al. | |
| 7,794,184 B2 | 9/2010 | Di Nicolantonio et al. | |
| 7,799,104 B2 | 9/2010 | Valentini | |
| 7,802,505 B2 | 9/2010 | Hetcher et al. | |
| D625,981 S | 10/2010 | Stirm | |
| 7,821,886 B2 | 10/2010 | Yuzuki | |
| D626,813 S | 11/2010 | Stirm | |
| 7,854,054 B2 | 12/2010 | Kopras et al. | |
| 7,871,311 B2 | 1/2011 | Wall et al. | |
| 7,871,313 B2 | 1/2011 | Roehm et al. | |
| D631,720 S | 2/2011 | Aglassinger | |
| D631,721 S | 2/2011 | Aglassinger | |
| 7,882,771 B2 | 2/2011 | Sasaki et al. | |
| 7,887,624 B2 | 2/2011 | Ekstrom et al. | |
| 7,905,260 B2 | 3/2011 | Keenan | |
| 7,909,114 B2 | 3/2011 | Nishikawa et al. | |
| 7,913,352 B2 | 3/2011 | Ishikawa et al. | |
| 7,938,873 B2 | 5/2011 | Fritz et al. | |
| 7,962,994 B2 | 6/2011 | Beers | |
| 7,976,363 B2 | 7/2011 | Reich et al. | |
| 7,976,364 B2 | 7/2011 | Roehm | |
| 8,015,657 B2 | 9/2011 | Beers et al. | |
| 8,016,048 B2 * | 9/2011 | Ueda et al. | 173/176 |
| 8,424,615 B2 * | 4/2013 | Baumann | B25F 5/021 173/170 |
| 8,733,470 B2 * | 5/2014 | Matthias | B25F 5/02 173/170 |
| 8,813,866 B2 * | 8/2014 | Suzuki | B25F 5/00 173/2 |
| 8,890,468 B2 * | 11/2014 | Bauer | 320/107 |
| 8,901,887 B2 * | 12/2014 | Sever | A47L 9/2857 15/328 |
| 9,009,982 B1 * | 4/2015 | Sedgwick | B23D 59/006 30/388 |
| 9,409,273 B2 * | 8/2016 | Brown | B25F 3/00 |
| 2001/0052429 A1 | 12/2001 | Frenzel et al. | |
| 2002/0129949 A1 * | 9/2002 | Bongers-Ambrosius | B08B 15/04 173/217 |
| 2002/0145724 A1 * | 10/2002 | Wursch | B23B 49/008 356/4.01 |
| 2002/0154960 A1 | 10/2002 | Lin | |
| 2003/0044247 A1 | 3/2003 | Wolfe | |
| 2004/0060145 A1 * | 4/2004 | Hayama | A47L 7/0085 15/339 |
| 2004/0154168 A1 | 8/2004 | McDonald | |
| 2004/0177980 A1 | 9/2004 | Lucas | |
| 2004/0251041 A1 * | 12/2004 | Grossman | 173/217 |
| 2005/0000052 A1 * | 1/2005 | Byles | A47L 9/02 15/314 |
| 2005/0037699 A1 | 2/2005 | Park | |
| 2005/0055795 A1 * | 3/2005 | Zeiler | A47L 5/14 15/353 |
| 2005/0082920 A1 * | 4/2005 | Heigl | B25F 5/02 310/50 |
| 2005/0105977 A1 | 5/2005 | Ishihara | |
| 2005/0111214 A1 * | 5/2005 | Zeiler | B25F 5/021 362/119 |
| 2005/0161305 A1 * | 7/2005 | Jenni | B25H 3/006 192/223 |
| 2005/0273969 A1 * | 12/2005 | Watson | A47L 5/14 15/344 |
| 2006/0016043 A1 | 1/2006 | Matsuhashi et al. | |
| 2006/0091858 A1 * | 5/2006 | Johnson | B25F 5/00 320/128 |
| 2006/0107634 A1 | 5/2006 | Ohlendorf | |
| 2006/0153650 A1 * | 7/2006 | Simm | B23Q 11/0046 408/58 |
| 2006/0178087 A1 | 8/2006 | Wuensch et al. | |
| 2006/0276116 A1 | 12/2006 | Reich et al. | |
| 2007/0039119 A1 | 2/2007 | Zahuranec et al. | |
| 2007/0113369 A1 * | 5/2007 | Cochran | A47L 5/14 15/327.5 |
| 2008/0018303 A1 * | 1/2008 | Scheucher | H01M 2/1072 320/128 |
| 2008/0020686 A1 | 1/2008 | Reich et al. | |
| 2008/0022479 A1 | 1/2008 | Zhao | |
| 2008/0060149 A1 * | 3/2008 | Wu | A46B 5/0095 15/29 |
| 2008/0124181 A1 | 5/2008 | Hintze et al. | |
| 2008/0189899 A1 | 8/2008 | Beers et al. | |
| 2008/0202781 A1 * | 8/2008 | Nishikawa | B23Q 11/0046 173/104 |
| 2008/0209739 A1 | 9/2008 | Saitoh | |
| 2008/0276776 A1 | 11/2008 | Kani et al. | |
| 2009/0032138 A1 | 2/2009 | Alleman et al. | |
| 2009/0100682 A1 | 4/2009 | Delfini et al. | |
| 2009/0136309 A1 | 5/2009 | Coulston et al. | |
| 2009/0148246 A1 | 6/2009 | Nishikawa et al. | |
| 2009/0148248 A1 | 6/2009 | Nishikawa et al. | |
| 2009/0158904 A1 | 6/2009 | Chen | |
| 2009/0171243 A1 * | 7/2009 | Hibner | A61B 10/0275 600/566 |
| 2009/0181606 A1 | 7/2009 | Loveless et al. | |
| 2009/0183336 A1 | 7/2009 | Kunz et al. | |
| 2009/0183614 A1 | 7/2009 | Auh et al. | |
| 2009/0188691 A1 | 7/2009 | Hahn | |
| 2009/0214307 A1 | 8/2009 | Nguyen | |

(56) References Cited

U.S. PATENT DOCUMENTS

| | | |
|---|---|---|
| 2009/0241283 A1 | 10/2009 | Loveless et al. |
| 2010/0000386 A1 | 1/2010 | Dagn |
| 2010/0021252 A1 | 1/2010 | Leckey |
| 2010/0037571 A1 | 2/2010 | Roehm |
| 2010/0072975 A1* | 3/2010 | Hori ................................ 324/66 |
| 2010/0155095 A1 | 6/2010 | Furusawa et al. |
| 2010/0170538 A1 | 7/2010 | Baker et al. |
| 2010/0197209 A1 | 8/2010 | Dehde et al. |
| 2010/0260565 A1 | 10/2010 | Santamarina et al. |
| 2010/0269647 A1 | 10/2010 | Baumann et al. |
| 2010/0316455 A1 | 12/2010 | Sanchez |
| 2011/0008117 A1 | 1/2011 | Kasuya et al. |
| 2011/0008118 A1 | 1/2011 | Yoshikane et al. |
| 2011/0023709 A1 | 2/2011 | Bosshard |
| 2011/0079207 A1 | 4/2011 | Guth |
| 2011/0081214 A1 | 4/2011 | Santamarina et al. |
| 2011/0113587 A1 | 5/2011 | Nagasaka et al. |
| 2011/0142558 A1 | 6/2011 | Hahn |
| 2011/0147031 A1* | 6/2011 | Matthias et al. ............. 173/217 |
| 2011/0185869 A1 | 8/2011 | Wasielewski et al. |
| 2011/0197389 A1* | 8/2011 | Ota et al. ....................... 15/339 |
| 2011/0226499 A1* | 9/2011 | Kakiuchi ............ B23Q 11/0046 173/75 |
| 2011/0226502 A1* | 9/2011 | Bito .................... B23Q 11/0046 173/197 |
| 2011/0266015 A1 | 11/2011 | Ohlendorf et al. |
| 2011/0266016 A1 | 11/2011 | Ohlendorf et al. |
| 2011/0283853 A1 | 11/2011 | Aoyama |
| 2011/0308830 A1 | 12/2011 | Furusawa et al. |
| 2012/0037385 A1* | 2/2012 | Suzuki et al. ..................... 173/2 |
| 2012/0043101 A1 | 2/2012 | Ishikawa et al. |
| 2012/0073077 A1* | 3/2012 | Ishikawa ............... A47L 9/2842 15/347 |
| 2012/0234570 A1* | 9/2012 | Machida ............ B23Q 11/0046 173/197 |
| 2012/0273243 A1* | 11/2012 | Tada .................. B23Q 11/0046 173/198 |
| 2012/0298391 A1* | 11/2012 | Kakiuchi ............ B23Q 11/0046 173/77 |
| 2012/0301762 A1* | 11/2012 | Welker et al. ................... 429/99 |
| 2013/0025893 A1* | 1/2013 | Ota ............................ H02J 1/10 173/2 |
| 2013/0031879 A1* | 2/2013 | Yoshikane ......... B23Q 11/0046 55/356 |
| 2013/0055523 A1* | 3/2013 | Yoshikane .............. B28D 7/02 15/347 |
| 2013/0183111 A1* | 7/2013 | Lerch ................ B23Q 11/0071 408/56 |
| 2013/0187461 A1* | 7/2013 | Goto ..................... A47J 31/005 307/38 |
| 2013/0213683 A1* | 8/2013 | Brewster ................ B23Q 11/00 173/198 |
| 2014/0008087 A1* | 1/2014 | Brown ...................... B25F 3/00 173/1 |
| 2014/0304939 A1* | 10/2014 | Suzuki ................. A47L 9/2857 15/339 |

FOREIGN PATENT DOCUMENTS

| | | |
|---|---|---|
| DE | 10342507 | 4/2005 |
| DE | 102004025880 | 11/2005 |
| DE | 102004026038 | 2/2006 |
| DE | 202006017578 | 3/2007 |
| DE | 102006029624 | 1/2008 |
| DE | 102007036783 | 2/2009 |
| EP | 434295 | 6/1991 |
| EP | 426321 | 2/1994 |
| EP | 601805 | 6/1994 |
| EP | 855247 | 7/1998 |
| EP | 958878 | 11/1999 |
| EP | 1245330 | 10/2002 |
| EP | 1281486 | 2/2003 |
| EP | 1293298 | 3/2003 |
| EP | 1459841 | 9/2004 |
| EP | 1459842 | 9/2004 |
| EP | 1477272 | 11/2004 |
| EP | 1477272 A1 | 11/2004 |
| EP | 1506840 | 2/2005 |
| EP | 1600255 | 11/2005 |
| EP | 1623793 | 2/2006 |
| EP | 1872900 | 1/2008 |
| EP | 2080476 | 7/2009 |
| EP | 2363237 | 9/2011 |
| EP | 2383071 | 11/2011 |
| EP | 2383072 | 11/2011 |
| GB | 1569532 | 6/1980 |
| GB | 2441224 | 12/2008 |

OTHER PUBLICATIONS

DEWALT, D25302DH Dust Extraction System with HEPA Filter, Instruction Manual, (2006), 6 page.
DE 102010010113.3-15 German Search Report dated Oct. 29, 2010, 3 pages.
DEWALT, D25300DH Dust Extraction System (HEPA Filter) for 2 kg L-Shape Hammer, catalog, (2011), 1 page.
DEWALT, D25302DH Dust Extraction System for 36V SDS Rotary Hammer, catalog, (2011), 1 page.
EP 111559340 European Search Report dated Jun. 28, 2011, 6 pages.

* cited by examiner

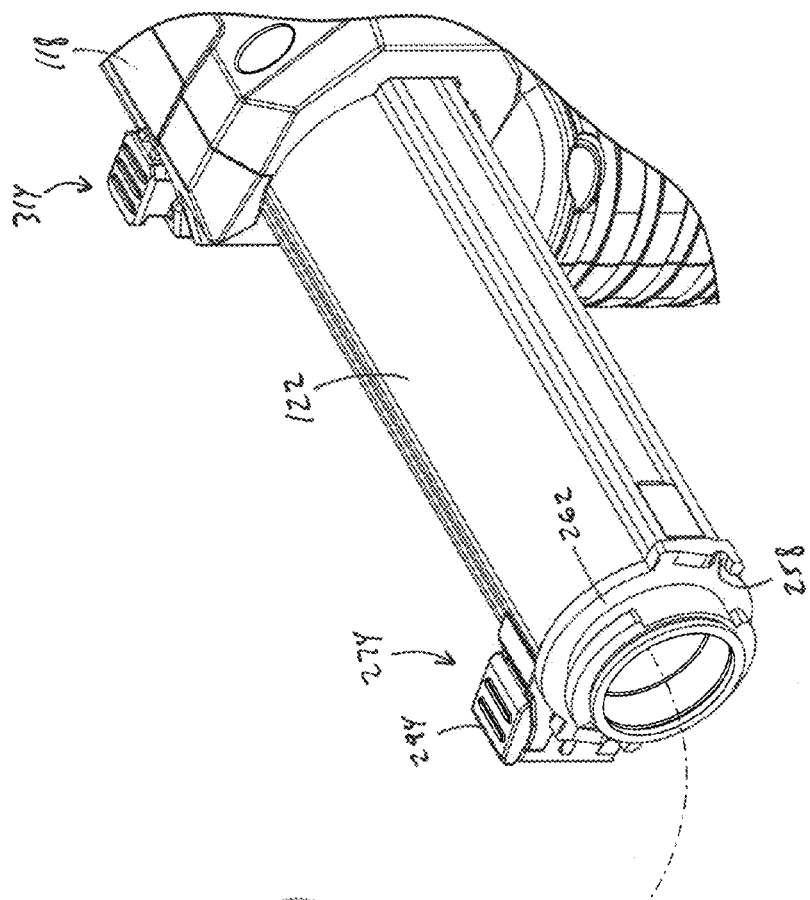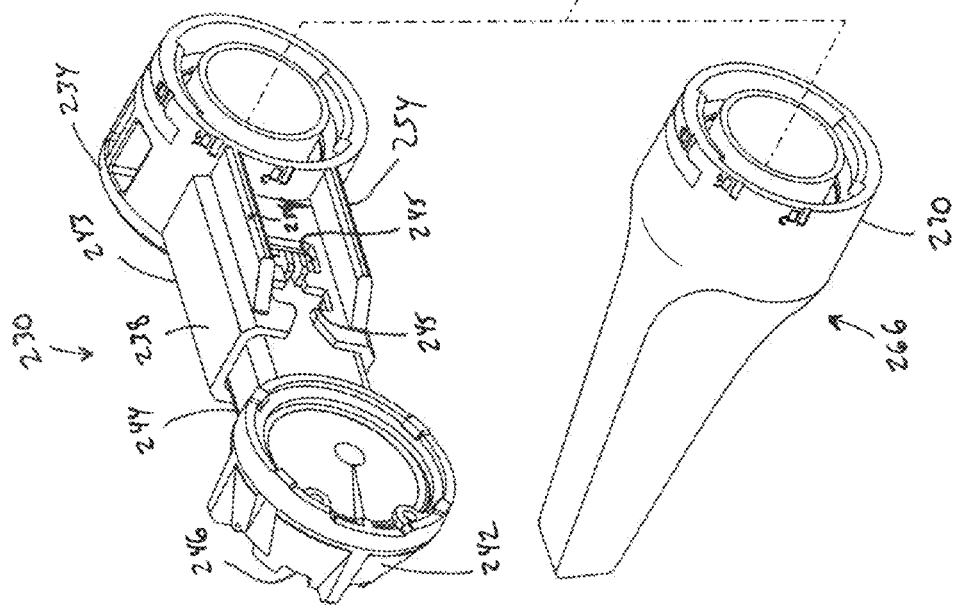
FIG. 12

POWER TOOL DUST COLLECTOR

CROSS-REFERENCE TO RELATED APPLICATIONS

This application claims priority to U.S. Provisional Patent Application Nos. 61/654,296 filed Jun. 1, 2012; 61/611,417 filed Mar. 15, 2012; and 61/611,003 filed Mar. 14, 2012, the entire contents of all of which are incorporated herein by reference.

This application is also a continuation-in-part of U.S. patent application Ser. No. 13/349,784 filed Jan. 13, 2012, now U.S. Pat. No. 8,967,923, the entire content of which is incorporated herein by reference.

Further, this application is a continuation-in-part of U.S. patent application Ser. No. 12/991,753 filed Jan. 31, 2011, now U.S. Pat. No. 8,813,868, which is a national stage entry under 35 U.S.C. §371 of International Patent Application No. PCT/US09/43365 filed May 8, 2009, which claims priority to U.S. Provisional Patent Application No. 61/051,892 filed May 9, 2008, the entire contents of all of which are incorporated herein by reference.

FIELD OF THE INVENTION

The present invention relates to power tools, and more particularly to dust collectors for use with power tools.

BACKGROUND OF THE INVENTION

Dust collectors are typically used in tandem with hand-held drilling tools such as rotary hammers to collect dust and other debris during a drilling operation to prevent dust and other debris from accumulating at a worksite. Such dust collectors may be attached to a rotary hammer to position a suction inlet of the collector proximate a drill bit attached to the rotary hammer. Such dust collectors may also include an on-board dust container in which dust and other debris is accumulated. Such dust containers are often removable from the dust collector to facilitate disposal of the accumulated dust and debris.

SUMMARY OF THE INVENTION

The invention provides, in one aspect, a power tool assembly including a hand-held power tool, a dust collector removably coupled to the power tool, and first and second power tool battery packs each of which is interchangeably coupled with the power tool and the dust collector for separately powering the power tool and the dust collector, respectively.

The invention provides, in another aspect, a dust collector for use with a hand-held power tool. The dust collector includes a housing, a telescoping suction pipe coupled to the housing, an electric motor positioned in the housing, a suction fan driven by the electric motor and operable to generate a vacuum in the suction pipe, a dust container coupled to the housing and positioned upstream of the suction fan, an adapter including a first portion coupled to the housing and a second portion, and an auxiliary handle coupled to the second portion of the adapter and a neck of the power tool. The adapter and the auxiliary handle support the power tool in a side-by-side relationship with the dust collector.

The invention provides, in yet another aspect, a dust collector for use with a hand-held power tool. The dust collector includes a housing, a telescoping suction pipe coupled to the housing, an electric motor positioned in the housing, a suction fan driven by the electric motor and operable to generate a vacuum in the suction pipe, and a switch electrically connecting the motor with a power source to activate the motor in response to detecting telescoping movement of the suction pipe relative to the housing.

The invention provides, in a further aspect, a dust collector including a housing, a telescoping suction pipe coupled to the housing, an electric motor positioned in the housing, a suction fan driven by the electric motor and operable to generate a vacuum in the suction pipe, and a handle assembly. The handle assembly includes a first handle having a head portion with a first size for receiving a neck of a first power tool for supporting the first power tool in a side-by-side relationship with the dust collector and a second handle having a head portion with a second size for receiving a neck of a second power tool for supporting the second power tool in a side-by-side relationship with the dust collector. The necks of the first and second power tools are of a different size.

The invention provides, in another aspect, a dust collector for use with a hand-held power tool. The dust collector includes a housing, a telescoping suction pipe coupled to the housing, an electric motor positioned in the housing, a suction fan driven by the electric motor and operable to generate a vacuum in the suction pipe, a dust container coupled to the housing and positioned upstream of the suction fan, and a filter supported by at least one of the housing and the dust container. The filter is removable from the one of the housing and the dust container for at least one of servicing and replacement.

The invention provides, in yet another aspect, a dust collector for use with a hand-held power tool. The dust collector includes a housing, a suction pipe coupled to the housing for telescoping movement along a first axis, an electric motor positioned in the housing, a suction fan driven by the electric motor and operable to generate a vacuum in the suction pipe, and a battery pack removably coupled to the housing along a second axis oriented substantially normal to the first axis.

The invention provides, in a further aspect, a dust collector for use with a hand-held power tool. The dust collector includes a housing, a telescoping suction pipe coupled to the housing, an electric motor positioned in the housing, a suction fan driven by the electric motor and operable to generate a vacuum in the suction pipe, a depth stop movable along the length of the suction pipe and selectively fixed to the suction pipe to limit the extent to which the suction pipe may telescope relative to the housing, and a ruler coupled for movement with the depth stop.

The invention provides, in another aspect, a dust collector for use with a hand-held power tool. The dust collector includes a housing, a telescoping suction pipe coupled to the housing, an electric motor positioned in the housing, a suction fan driven by the electric motor and operable to generate a vacuum in the suction pipe, a dust container removably coupled to the housing in which dust may be accumulated, a filter supportable by at least one of the housing and the dust container, and a detector coupled to the housing and biased toward a first position in which a portion of the detector protrudes from the housing to prevent the container from being coupled to the housing in absence of the filter. The portion of the detector is retractable into the housing in response to the detector being moved to a second position by the filter when the filter is present, thereby permitting the container to be coupled to the housing.

Other features and aspects of the invention will become apparent by consideration of the following detailed description and accompanying drawings.

BRIEF DESCRIPTION OF THE DRAWINGS

FIG. 12 is an enlarged, front perspective view of the dust collector of FIG. 5, illustrating the suction head and a stand-alone nozzle being interchangeably coupled to the suction pipe.

Figure 1:
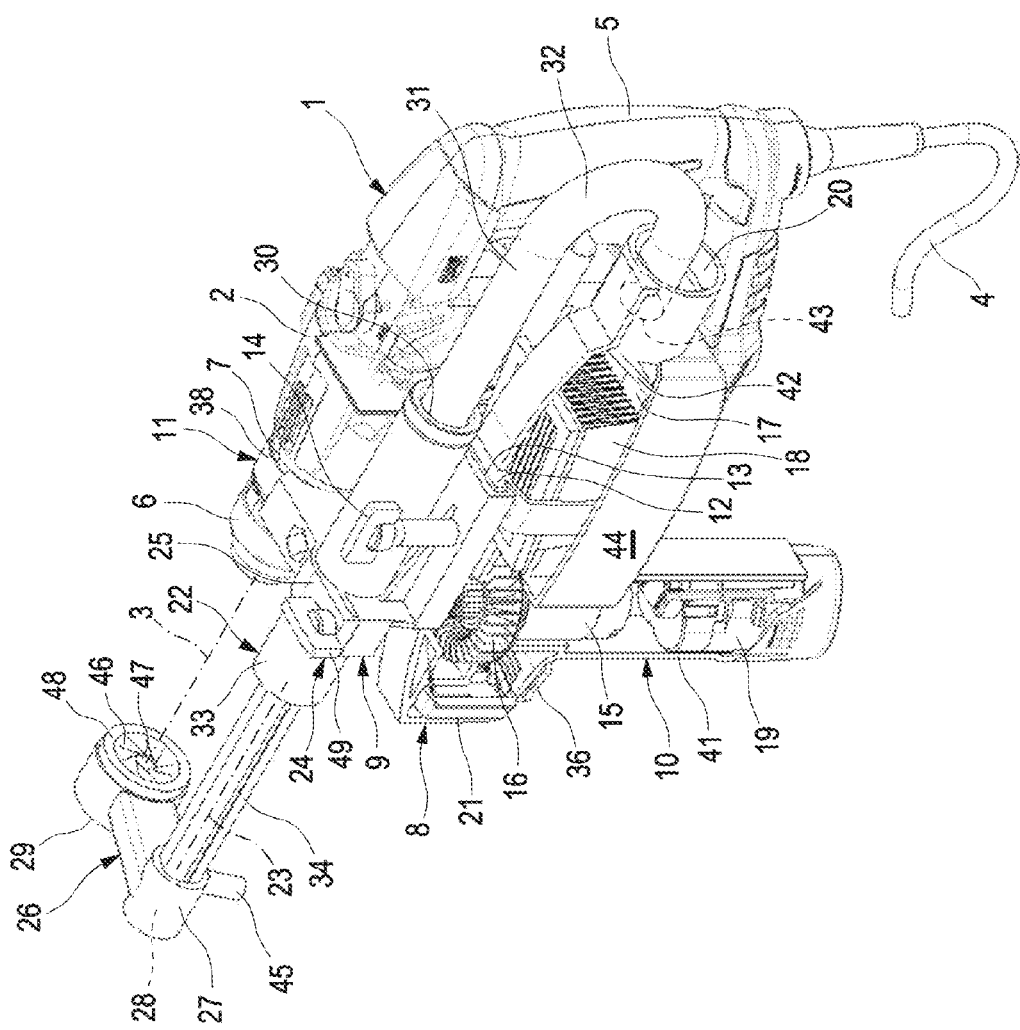
FIG. 1 is a partially cutaway, perspective view of a dust collector in accordance with an embodiment of the invention attached to a rotary power tool.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

As shown in FIGS. 1 to 4, a drilling machine or rotary power tool 1, which may configured as a percussion rotary power tool, a rotary hammer, or a hammer drill, includes a housing 2 in which a spindle (not shown) is drivable in a rotary manner about an axis of rotation 3. For this purpose, the rotary power tool 1 includes an electric motor (also not shown), which may be connected to a remote power source via a power cable 4. Instead of the power cable 4, the rotary power tool 1 may also be equipped with an on-board power source such as a rechargeable battery or a rechargeable battery pack. Since the rotary power tool 1 is thus operated electrically, it is thus an electric rotary power tool or generally a power tool or electrically powered appliance.

The rotary power tool 1 is also equipped with a handle 5. It may thus be operated by hand and accordingly be designated a hand-held rotary power tool 1. Accordingly, the rotary power tool 1 may generally be a hand-held power drill or a hand-held power tool or hand-held power machine tool.

In the example shown, the rotary power tool 1 and its housing 2 form an L-shape, since the tool's axis of rotation 3 is aligned essentially perpendicularly to the axis of rotation of a rotor of the electric motor for driving the spindle and/or the tool. In contrast to this, in the "pistol configuration" the axis of the electric motor's rotor is aligned essentially parallel to axis of rotation 3 of the tool.

Figure 2:
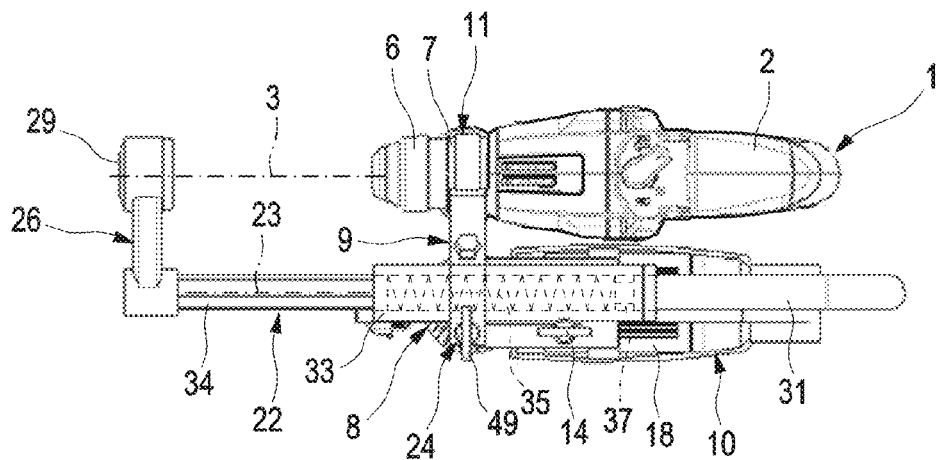
FIG. 2 is a top view of the dust collector and rotary power tool of FIG. 1.
Figure 3:
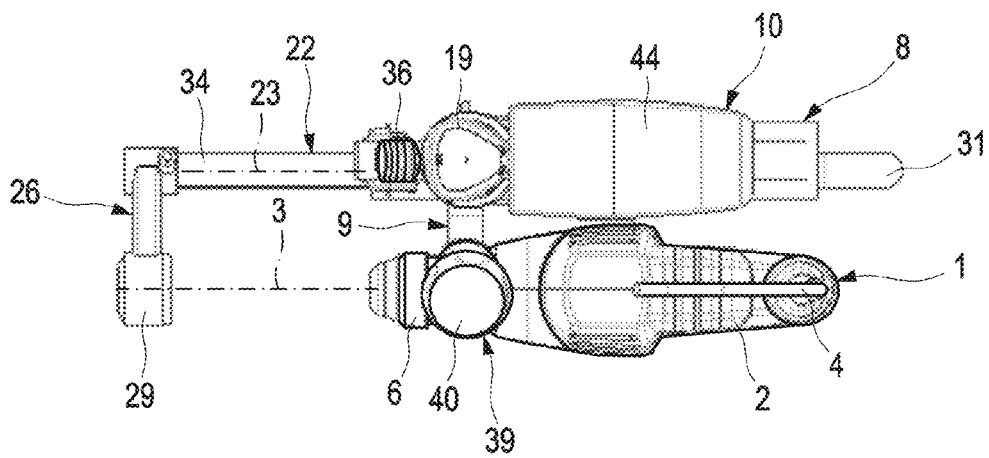
FIG. 3 is a bottom view of the dust collector and rotary power tool of FIG. 1.
Figure 4:
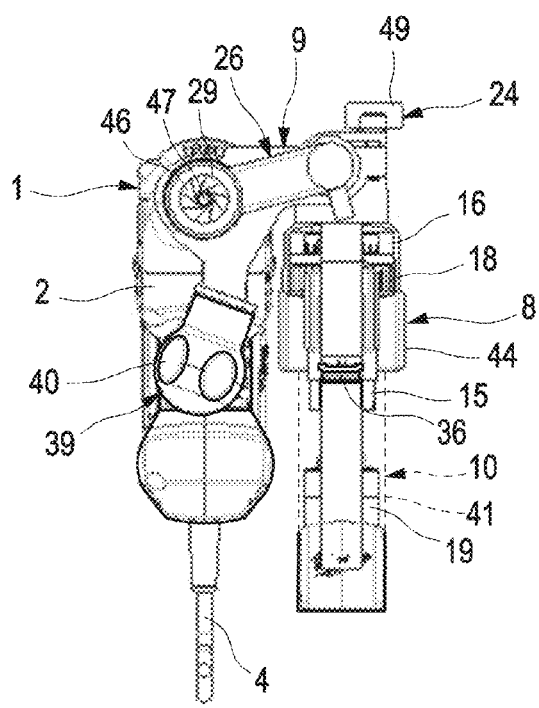
FIG. 4 is a front view of the dust collector and rotary power tool of FIG. 1.

With reference to FIGS. 1-3, the rotary power tool 1 is also equipped with a chuck 6 that is drivable in a rotary manner about axis of rotation 3 via the spindle. The chuck 6 serves to hold a tool, particularly a drilling tool, which may be a drill bit, a hammer drill bit, or a masonry drill bit. When the respective tool is in place, it rotates about the axis of rotation 3, which will also be referred to in the following as the axis of rotation of the tool 3. Adjacent to the chuck 6, the housing 2 of rotary power tool 1 is furnished with a clamping neck 7 (FIGS. 1 and 2), which has a cylindrical shape in the illustrated embodiment. On most commercially available rotary power tools 1, the cross section of the clamping neck 7 conforms to a standard size, for example 43 mm. The clamping neck 7 is normally used for mounting an additional handle (not shown).

The rotary power tool 1 shown in FIGS. 1-4 is equipped with a dust suction device or dust collector 8 in accordance with an embodiment of the invention. The dust collector 8 constitutes a separate device from the rotary power tool 1, and may be attached detachably to the rotary power tool 1. Accordingly, the rotary power tool 1 may or may not be equipped with dust collector 8 depending on the requirement of the application.

In the mounted state shown in FIGS. 1-4, the dust collector 8 is arranged on one side of the rotary power tool 1. With reference to the normal operating position for the rotary power tool 1, as reflected in FIGS. 1-4, the dust collector 8 is arranged to the left of the rotary power tool 1. The dust collector 8 is expediently designed so that it may be mounted to the right of the rotary power tool 1 in the same way. The dust collector 8 is then located entirely to the side of the rotary power tool 1, except for a fastening device 11, which will be explained in greater detail below, via which the dust collector 8 may be fastened to the rotary power tool 1. The dust collector 8 is designed in such a way that it may be mounted beside rotary power tool 1, and this in turn means that it may also be used on L-shaped rotary power tools 1 as well as pistol-type rotary power tools 1 regardless of the size of the respective rotary power tool 1.

The dust collector 8 includes an adapter or support frame 9 and a housing 10 that is shown in partial cutaway in FIG. 1. The support frame 9 is attached to the clamping neck 7 of the rotary power tool 1 with the aid of the fastening device 11. The notable feature of this arrangement is that the dust collector 8 is fastened only to the clamping neck 7, and is only in contact with the rotary power tool 1 in the area of the clamping neck 7. As a result, the dust collector 8 may be mounted on the clamping neck 7 in the same way as an auxiliary handle, that is to say instead of an auxiliary handle.

Because clamping necks 7 are usually standardized in terms of shape and size (e.g., having a diameter of about 43 mm), this also makes it possible to mount the dust collector 8 on a wide range of different standard rotary power tools 1. Since there is no other contact between the mounted dust collector 8 and the rotary power tool 1, the dust collector 8 does not have to be adapted further to fit the respective rotary power tool 1 thereby making it considerably easier to use the dust collector 8 with a range of different rotary power tools 1. Consequently, the dust collector 8 may be used on many different models of rotary power tools 1 since the fastening device 11 not only enables attachment to the clamping neck 7, it also enables this attachment without any other connection between the dust collector 8 and the rotary power tool 1, so that no further adaptation has to be made between the rotary power tool 1 and the dust collector 8.

With continued reference to FIG. 1, the housing 10 is attached to the support frame 9. For this purpose, for example, a plug-in connector 12 may be conformed integrally to the housing 10, and a complementary plug-in socket 13 may be provided on the support frame 9. In particular, the plug-in connector 12 may be plugged into the plug-in socket 13 parallel to the axis of rotation of the tool 3. The shape of the connector 12 and socket 13 is selected such that when plugged into the socket 13 the connector 12 is held in place by a positive lock. In this case, a shape according to which the housing 10 is detachably attached to the support frame 9 is particularly advantageous. For example, a retaining screw 14 may be provided to cooperate with the inserted plug-in connector 12 to secure the connector 12 in the socket 13. Thus, the retaining screw 14 may engage in the connector 12 in a positive locking manner or it may brace the inserted connector 12 in the socket 13 in a non-positive locking manner.

The connector 12 and socket 13 permit different size housings 10 to be attached to the same support frame 9. Such housings 10 may be constructed differently, particularly with respect to a dust collection chamber 17 (described in further detail below), for different applications to accommodate both large and small dust collection chambers 17 depending upon the type of material being worked upon.

With continued reference to FIG. 1, an electric motor 15 and a suction fan 16 are disposed in the housing 10. The electric motor 15 drives the suction fan 16. The housing 10 also contains a dust collection chamber 17. The housing 10 further accommodates a dust filter 18. The housing 10 also has a power source 19 for supplying the electric motor 15 with electrical energy. The power source 19 may be in the form of a battery, but preferably a rechargeable battery or rechargeable battery pack.

The housing 10 is also furnished with an air inlet 20 and an air outlet 21, which may have the form of a plurality of slots positioned radially adjacent to the suction fan 16. The dust filter 18 is arranged upstream of the suction fan 16 in a flow path leading from the air inlet 20 to the air outlet 21. In this way, the fan 16 is protected from being hit by dirt particles and other debris. Accordingly, the dust collection chamber 17 is also located upstream of the fan 16 and upstream of the dust filter 18.

With continued reference to FIG. 1, a straight suction pipe 22 is fastened to the support frame 9 in such manner that it is axially adjustable on the support frame 9. The axial direction of the suction pipe 22 is defined by its longitudinal centreline 23, which extends parallel to the axis of rotation of the tool 3 when the dust collector 8 is mounted. As the suction pipe 22 is axially adjustable, it is possible to adjust the dust collector 8 to match the different lengths of the tools inserted in the chuck 6. Once its position has been adjusted relative to the support frame 9, the suction pipe 22 may be locked in position via a locking device 24. The locking device 24 may include for example a clip 25 that extends over the suction pipe 22 and a retaining screw 49 for clamping the suction pipe 22 to the support frame 9.

With reference to FIGS. 1-4, a suction channel 26 is attached to the suction pipe 22 distally with respect to the support frame 9. A first end 27 of the suction channel 26 is coupled to an inlet end 28 of the suction pipe 22 and is in fluid communication therewith. At the other end, the suction channel 26 is furnished with a suction opening 29 facing away from the rotary power tool 1. When the dust collector 8 is mounted, the suction opening 29 is aligned coaxially with the axis of rotation of the tool 3. The suction opening 29 may have a circular cross section.

The outlet end 30 of the suction pipe 22 is connected to an at least partly flexible tube 31, which in turn is connected to the inlet opening 20 of the housing 10. The tube 31 is constructed flexibly with at least one U-shaped curved section 32. It is practical to construct the tube 31 so that the entire length thereof is flexible, that is to say from outlet end 30 to the air inlet 20. The tube 31 is attached detachably to the suction pipe 22. Alternatively, the tube 31 may be attached detachably to the housing 10. It is also possible to attach the tube 31 detachably to both the suction pipe 22 and the housing 10. In conjunction with the housing 10 that is attached detachably to the support frame 9, the detachable tube 31 enables easy mounting and removal of the housing 10 from the support frame 9. The flexibility of the tube 31 enables easy adaptation of the connection between the suction pipe 22 and the inlet opening 20 when the suction pipe 22 is adjusted lengthwise.

With reference to FIG. 1, the suction pipe 22 is advantageously of telescoping construction. For this purpose, the suction pipe 22 includes an outer pipe 33 arranged on the support frame 9 and an inner pipe 34 arranged coaxially therewith and positioned inside the outer pipe 33 so as to be slidable in a telescoping manner. The inner pipe 34 carries the suction channel 26. The outer pipe 33 is attached to the support frame 9 so as to be axially adjustable and connected to tube 31. The outer pipe 33 thus enables the suction pipe 22 to be adjusted axially so that the dust collector 8 may be adapted to the differing lengths of the drilling tool with which it is used, for example a drill bit, a masonry drill bit, or a hammer drill bit. The telescoping capability of the suction pipe 22 enables the dust collector 8 to be adjusted automatically and steplessly to the drilling depth while the rotary power tool 1 is being operated. As the depth of the hole created with the drilling tool increases, so the inner pipe 34 extends deeper into the outer pipe 33.

In order to provide a dust-tight fluid coupling between the inner pipe 34 and the outer pipe 33, a corrugated or expandable tube (not shown) may be provided that folds together like an accordion when the inner pipe 34 advances into the outer pipe 33, and unfolds in the manner of an accordion when the inner pipe 34 is withdrawn from the outer pipe 33.

As shown in FIG. 2, the inner pipe 34 may be braced axially against the outer pipe 33 via a compression spring 35. In this way, the inner pipe 34 is pre-tensioned outwardly. As a consequence, the suction channel 26 is pre-tensioned when the suction opening 29 thereof comes into contact with the obstruction to be drilled. The compression spring 35 may particularly be integrated in the corrugated tube described above.

In order to be able to switch on the dust collector 8 manually, it may be equipped with a button switch 36 (FIGS. 1 and 3) that is operable manually, for example by rotating, pressing or sliding, and which is attached to housing 10. In addition or alternatively, as shown in FIG. 2, a pressure switch 37 may be provided that switches on the dust collector 8 automatically when the suction channel 26 is pressed against an obstruction or a workpiece that is to be drilled. Actuation of the respective switches 36 or 37 energizes the electric motor 15 and thus causes the fan 16 to activate. In the illustrated embodiment of the dust collector 8, the pressure switch 37 is arranged axially between the compression spring 35 and the outer pipe 33. However, the pressure switch 37 might also be arranged axially between the compression spring 35 and the inner pipe 34, for example.

In the illustrated embodiment of the dust collector 8, at least three switching positions are assigned to the button switch 36. In a first switching position, the electric motor 15 and fan 16 may be manually switched off or deactivated irrespective of actuation of the pressure switch 37, so that the fan 16 cannot be activated by operating the pressure switch 37. In a second switching position, the pressure switch 37 is activated so that the fan 16 may be switched on and off by the operating pressure switch 37. In other words, in the second switching position, the electric motor 15 and fan 16 may be activated and deactivated automatically in response to actuation of the pressure switch 37. In a third switching position, the electric motor 15 and fan 16 may be switched on or activated manually regardless of the pressure switch 37 being operated. In other words, in the third switching position, the electric motor 15 may be activated manually irrespective of actuation of the pressure switch 37. Therefore, when the button switch 36 is toggled to the third switching position, the dust collector 8 may be used as a stand-alone suction or vacuum device when it is detached from the rotary power tool 1. The first, second, and third switching positions may occur in any sequential order depending upon the configuration of the switch 36.

With reference to FIG. 1, the fastening device 11, which is used to secure the dust collector 8 to the rotary power tool 1, has a band clamp 38. The band clamp 38 encircles the clamping neck 7 coaxially with the axis of rotation of the tool 3 to enable the dust collector 8 to be mounted on the rotary power tool 1. The fastening device 11 is also furnished with a clamping device 39 (FIG. 3), that enables the band clamp 38 to be tightened when it is in place around the clamping neck 7. Tightening the clamp band 38 then creates a non-positive locking engagement securing the support frame 9 on the clamping neck 7. The clamping device 39 may be equipped with a manually operable toggle lever 40 that may be used to tighten the band clamp 38. The toggle lever 40 is designed as an additional or auxiliary handle, as is shown particularly clearly in FIG. 4.

The fastening device 11 may be designed for a specific cross section of the clamping neck 7, for example for a standard circular cross section with a 43 mm diameter.

In the illustrated embodiment of the dust collector 8, the housing 10 is also furnished with a housing section 41 that is constructed in the form of an additional handle (FIG. 1). This housing section 41 contains the electric motor 15 and the power source 19. The dust collector 8 described here may thus particularly advantageously offer two additional handles for the rotary power tool 1, that is to say the toggle lever 40 and the housing section 41, which helps considerably to ease the operation of the rotary power tool 1. The housing section 41 extends essentially perpendicularly to the longitudinal centreline 23 of the suction pipe 22.

The dust filter 18 may be designed as a fine dust filter. Such a fine dust filter, which may also be referred to as a HEPA filter (High Efficiency Particulate Absorber), is able to trap at least 99.97% of particles 0.3 microns and smaller that are typically generated during drilling. In this way, not only is the fan 16 protected from being hit by larger particles but fine dust is also prevented from contaminating the area surrounding the rotary power tool 1, thereby reducing the hazard to the health of the operator using it. The dust filter 18 may include a standard filter medium such as a fleece material or a paper material.

In order to prevent the dust filter 18 from being damaged by the impact of larger particles as well, an impactor 42 (FIG. 1) may be arranged in the flow path and upstream of the dust filter 18 in the housing 10. The impactor 42 forms a collision plate that is arranged in the flight path of the airborne particles, in the area of the air outlet 20 and downstream of an outlet end 43 of the tube 31. The impactor 42 causes a powerful flow diversion of the arriving suction stream, causing it initially to be directed away from the dust filter 18. The impactor 42 diverts the arriving stream into the dust collection chamber 17. Once there, the stream must then be redirected again so that it reaches the suction side of the fan 16 through the dust filter 18. In this way, it is possible to prevent the dust filter 18 from being bombarded directly by the particles carried along in the airflow. At the same time, the airborne particles are subjected to a powerful decelerating force, thus enabling them to accumulate more easily in the dust collection chamber 17.

The dust collection chamber 17 is defined at least partially by a collection container 44 (FIG. 1). The collection container 44 is a separate component from the housing 10 and is attached detachably to the housing 10. Together, the housing 10 and the collection container 44 define the dust collection chamber 17. Because the collection container 44 is detachable, the dust collection chamber 17 may be emptied very easily. Moreover, different collection containers 44 may be selected for attachment to the housing 10. For example, the comparatively small collection container 44 shown is suitable for collecting rock waste material that is created when drilling in concrete or rock. However, if the rotary power tool 1 is to be used for drilling wood, a considerably larger dust collection chamber 17 is required and a correspondingly larger collection container or collecting pouch or bag may accordingly be attached to the housing 10.

It is particularly advantageous to make the collection container 44 from a relatively hard and/or rigid plastic, which is practically designed so that the collection container 44 is not noticeably deformed due to the vacuum generated in the dust collection chamber 17 when the dust collector 8 is being operated.

The housing 10 may also be made such that it is at least partly transparent to visible light at least in the area of the dust collection chamber 17. For example, the housing 10 may be furnished with a transparent window in the area of the dust collection chamber 17 to view the accumulated height of the dust and other debris within the chamber 17. If, as here, a collection container 44 is used the container 44 may be made to be entirely transparent for the same purpose. The collection container 44 may equally contain at least one transparent window, and the rest of the container 44 may be non-transparent or opaque. The housing 10 is advantageously made from a plastic for this purpose. If the housing 10 and/or collection container 44 includes transparent and non-transparent areas, the housing 10 and the collection container 44 may be manufactured using different plastics.

Unlike the housing 10, the support frame 9 is advantageously made from metal, a lightweight metal or lightweight metal alloy being preferred. Aluminium or an aluminium alloy is particularly suitable for the purpose.

If the power source 19 is configured as a rechargeable battery or rechargeable battery pack, as here, it may be fitted detachably to the handle-shaped section 41 in the housing 10. In this way, it is possible for example to charge the power source 19 using a separate charger. This also makes it possible to use several power sources 19 in an alternating manner.

The suction channel 26 may be disposed on the suction pipe 22 so as to be rotatable about the longitudinal centerline 23 of the suction pipe 22. A locking device 45 (FIG. 1) may be provided between the suction channel 26 and the suction pipe 22 to lock the suction channel 26 in a given rotated position. The locking device 45 may be, for example, a setscrew for locking the sleeve-like end 27 relative to the suction pipe 22, or the inner pipe 34 thereof, to assure a non-positive lock at the desired rotated position.

The suction channel 26 may have a screen 46 on a side facing away from the suction opening 29, which is facing towards the viewer in FIG. 1. The screen 46 has a screen aperture 47, the size of which is adjustable, through which a tool bit is received. When the dust collector 8 is mounted on the rotary power tool 1, the screen aperture 47 is positioned coaxially with the axis of rotation of the tool 3. The respective drilling tool passes through the screen opening 47 as far as the suction opening 29. Because the screen aperture 47 is adjustable, the suction channel 26 may be adapted to accommodate the various diameters of the drilling tools used. For example, the screen 46 is equipped with an adjusting ring 48 that may be used to adjust the opening size of the screen aperture 47. The adjusting ring 48 may be turned manually to change the opening size of the screen aperture 47.

The suction channel 26 has a predefined length that is synchronized with the distance between the axis of rotation of the tool 3 and the centerline axis of the suction pipe 22, which is adjusted when the dust collector 8 is mounted on a rotary power tool 1 having a standard clamping neck 7 cross section to which the dust collector 8 is adapted. To enable other cross sections of the clamping neck 7 as well, in another embodiment of the dust collector 8, the suction channel 26 may also be designed so that its length is adjustable.

The dust collector 8 is designed such that it may be operated using an on-board power source and mounted on the rotary power tool 1 in such way that when mounted it is positioned next to the rotary power tool 1 in a typical working position of the rotary power tool 1, and spaced apart from the rotary power tool 1 by the fastening device 11 such that the dust collector 8 does not otherwise touch or contact the rotary power tool 1.

Figure 5:
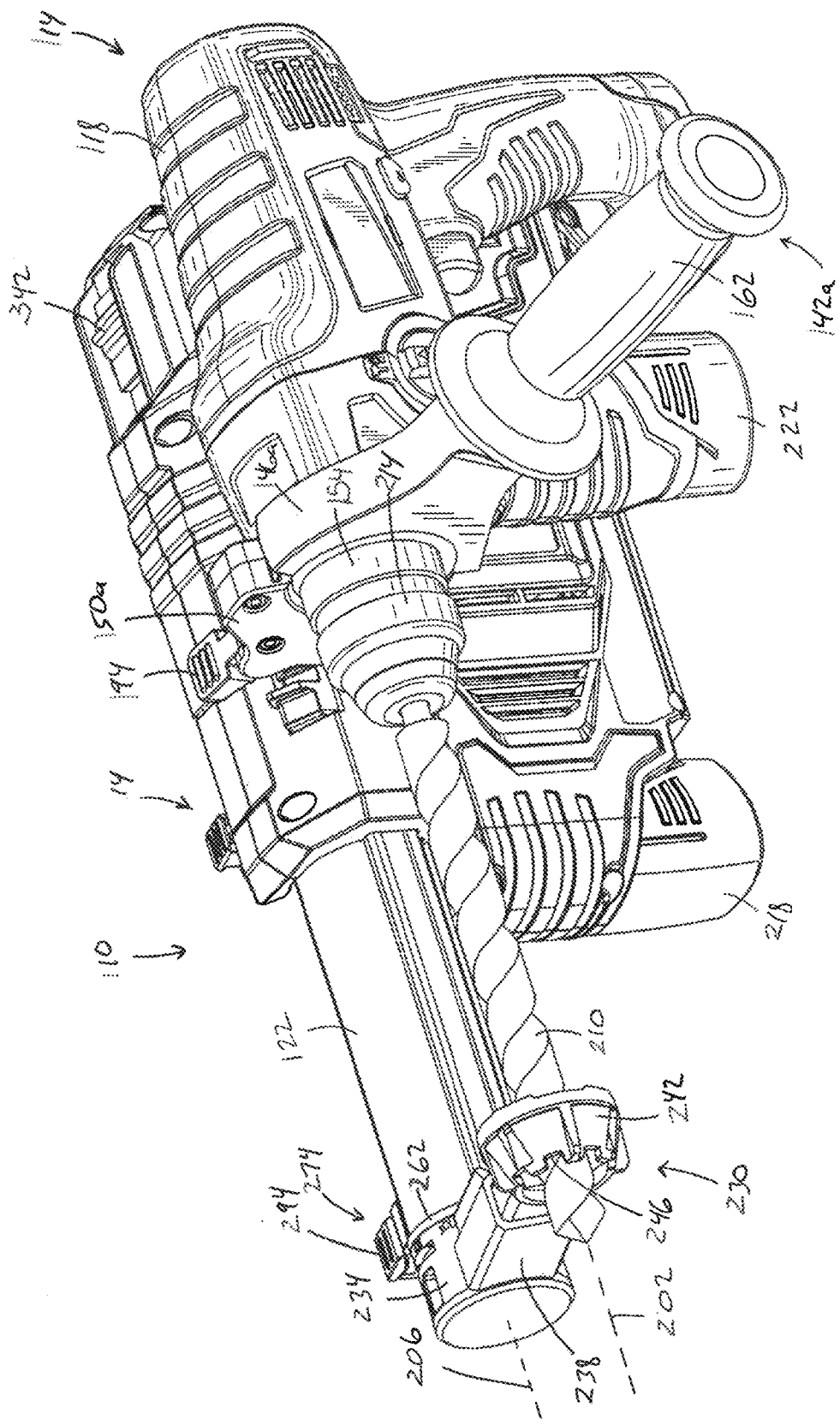
FIG. 5 is a front perspective view of a dust collector in accordance with another embodiment of the invention attached to a rotary power tool.
Figure 6:
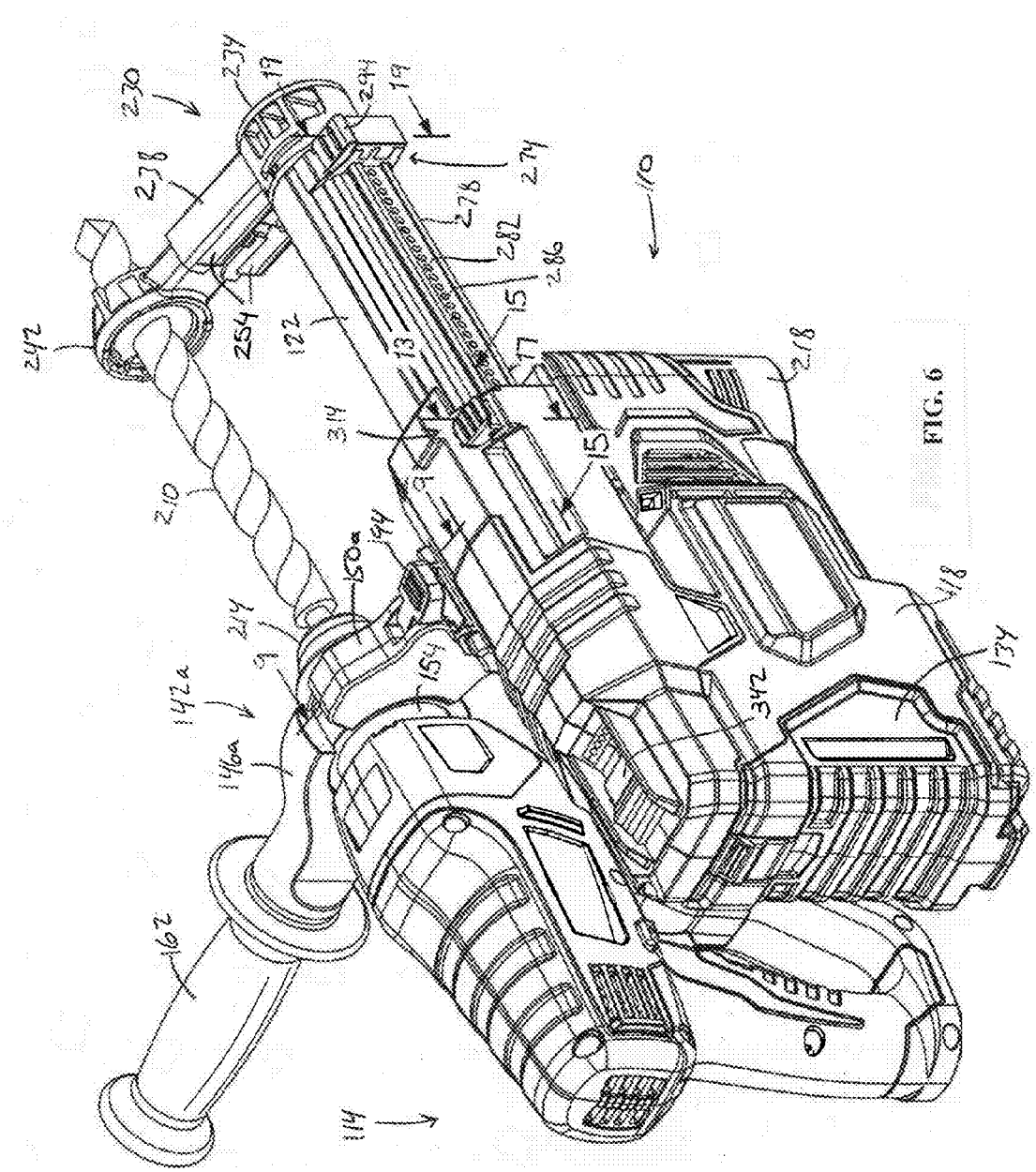
FIG. 6 is a rear perspective view of the dust collector and rotary power tool of FIG. 5.

FIGS. 5 and 6 illustrate a dust collector 110 in accordance with another embodiment of the invention for use with a hand-held rotary power tool 114 (e.g., a rotary hammer). As will be described in more detail below, the dust collector 110 is operable to collect dust and other debris from a workpiece during a drilling and/or hammering operation performed by the power tool 114 to maintain the user's work area substantially clear of dust.

Figure 7:
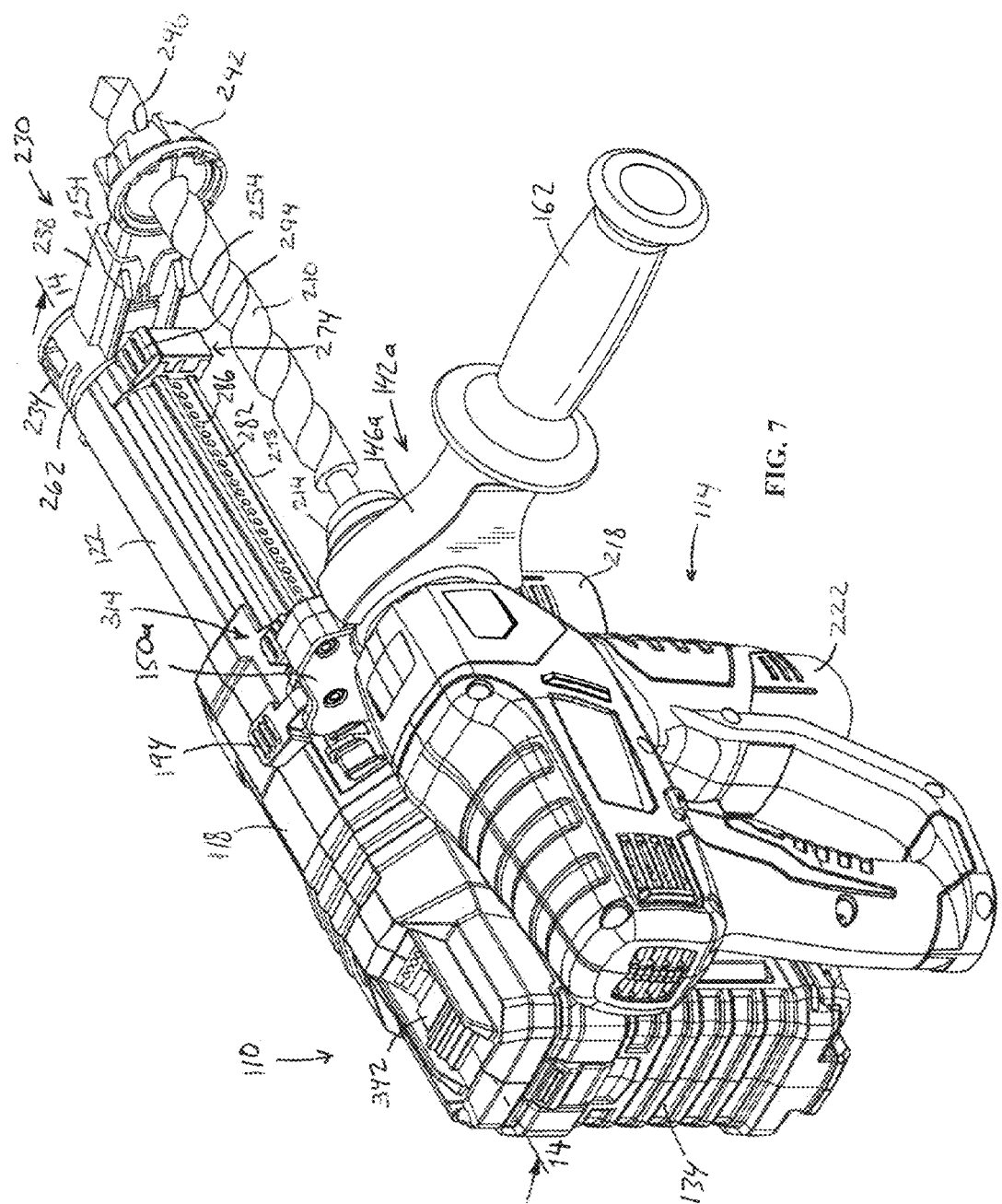
FIG. 7 is a rear perspective view of the dust collector of FIG. 5 attached to an opposite side of the rotary power tool.

The dust collector 110 includes a housing 118, a telescoping suction pipe 122 coupled to the housing 118, an electric motor 126 positioned in the housing 118 (FIG. 14), a suction fan 130 driven by the electric motor 126 and operable to generate a vacuum in the suction pipe 122, and a dust container 134 coupled to the housing 118 and positioned upstream of the suction fan 130. With reference to FIGS. 5 and 7, the dust collector 110 includes a handle assembly 138 that supports the power tool 114 in a side-by-side relationship with the dust collector 110. Particularly, the handle assembly 138 may be attached to either side of the housing 118 depending upon which side of the dust collector 110 the user wants to position the power tool 114.

Figure 8:
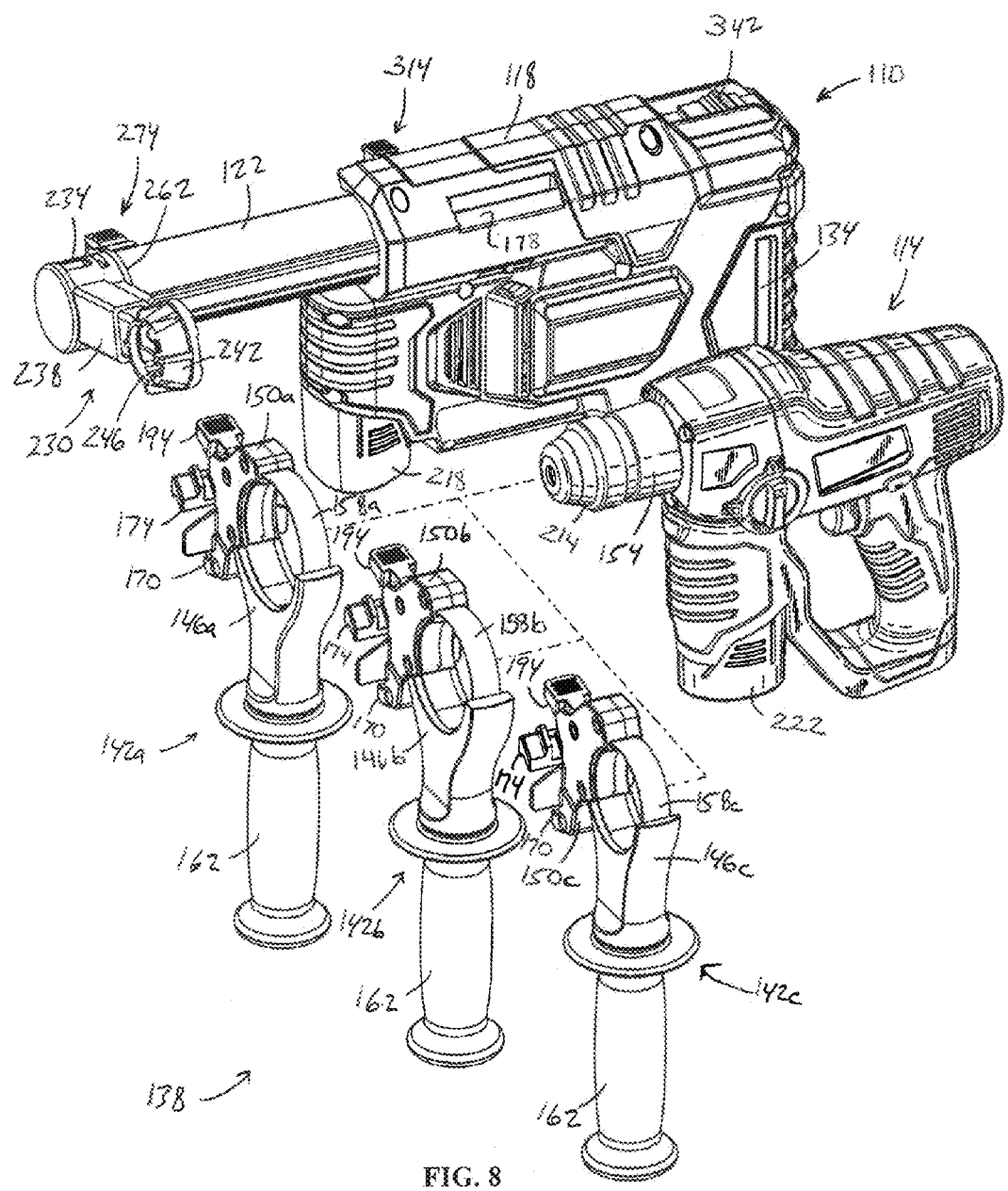
FIG. 8 is a front perspective view of the dust collector of FIG. 5, illustrating a handle assembly having multiple size handles for attaching rotary power tools of different sizes.
Figure 9:
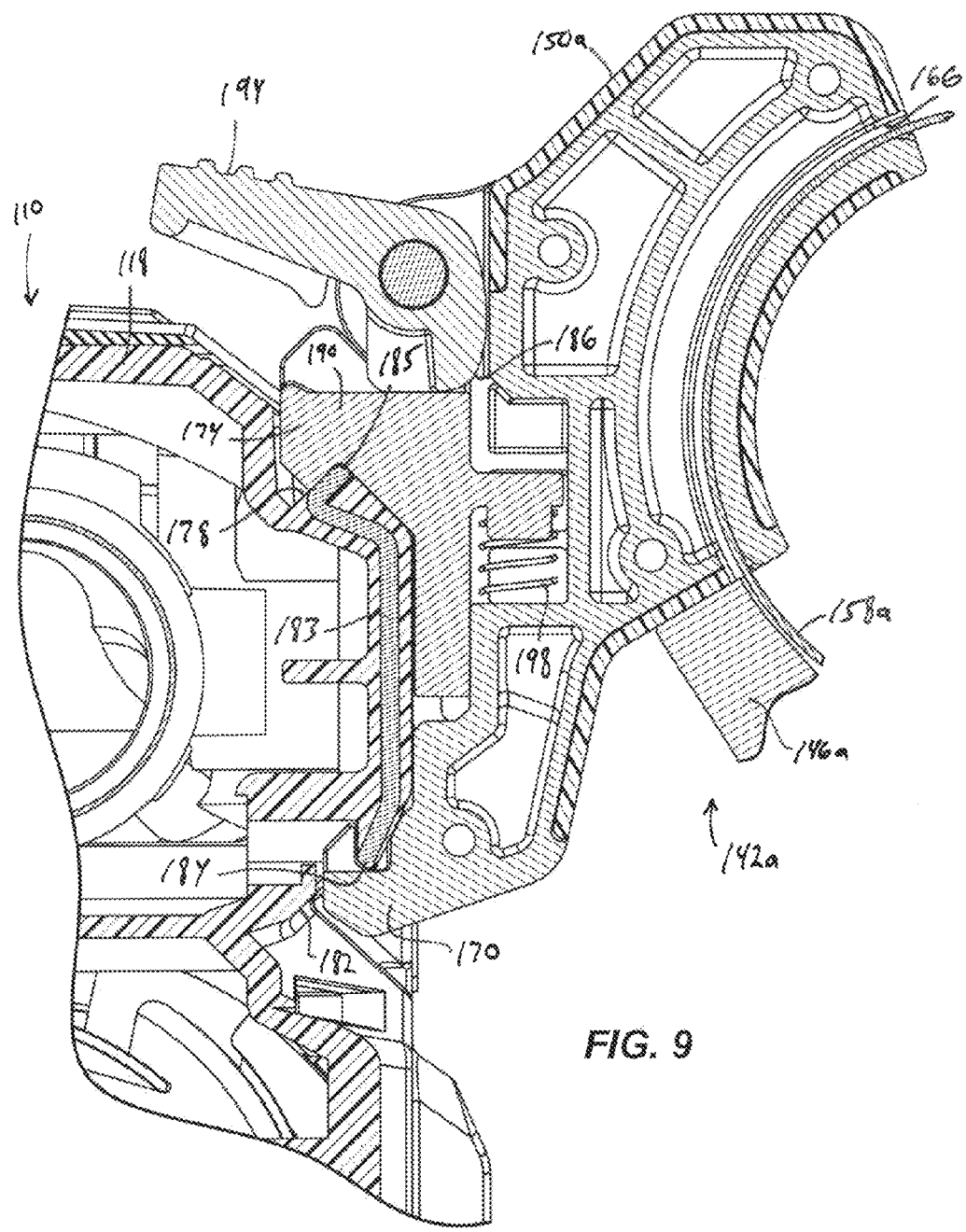
FIG. 9 is an enlarged, partial cross-sectional view of an adapter for use with any of the handles of FIG. 8.

With reference to FIG. 8, the handle assembly 138 includes multiple handles 142*a*, 142*b*, 142*c* having respective head portions 146*a*, 146*b*, 146*c* of a different size to accommodate power tools 114 of corresponding sizes, and respective adapters 150*a*, 150*b*, 150*c* for securing the handles 142*a*-142*c* to the housing 118. In the illustrated embodiment of the handle assembly 138, three handles 142*a*-142*c* are shown each having a head portion 146*a*-146*c* of a different size in which a corresponding sized neck 154 on the power tool 114 is clamped. Alternatively, the handle assembly 138 may include more or fewer handles 142*a*-142*c* of different sizes. Each of the handles 142*a*-142*c* includes a cylindrical band 158*a*, 158*b*, 158*c* that is constricted and expanded by rotating a grip 162 on the handle 142*a*-142*c* in opposite directions. The bands 158*a*, 158*b*, 158*c* include different circumferential lengths to accommodate power tools 114 having corresponding sized necks 154. The adapters 150*a*-150*c* each include an arcuate slot 166 in which a portion of the band 158*a*-158*c* is received (FIG. 9). Accordingly, the adapters 150*a*-150*c* are connected to the head portions 146*a*-146*c* as a unit. In an alternative embodiment of the handle assembly 138, only a single grip 162 may be provided for interchangeable use with any of the head portions 146*a*-146*c*. For example, to exchange any of the handles 142*a*-142*c* for another, the grip 162 may be unthreaded from one of the head portions 146*a*-146*c* and threaded to another of the head portions 146*a*-146*c*.

With continued reference to FIG. 9, the adapter 150 includes a fixed clamp member 170 and an opposed, movable clamp member 174 for clamping the adapter 150 to either side of the housing 118. Particularly, the fixed clamp member 170 is received within a first notch 178 in the housing 118, and the movable clamp member 174 is received within a second notch 182 in the housing 118. The notches 178, 182 are defined in each side of the housing 118 to clamp the adapter 150 to either side of the housing 118. In the illustrated embodiment of the dust collector 110, a metal reinforcing plate 183 is insert molded with the housing 118 between the notches 178, 182 such that the clamp members 170, 174 engage bottom and top edges 184, 185 of the plate 183, respectively. Alternatively, the plate 183 may be omitted.

The adapter 150 also includes a cam 186 and a follower 190 for actuating the movable clamp member 174 between an open position in which it is displaced from the second notch 182 and disengaged from the housing 118, and a closed position in which the movable clamp member 174 is received within the second notch 182 and engaged with the housing 118 (FIG. 9). In the illustrated embodiment of the adapter 150, the cam 186 is integrally formed as a single piece with a lever 194, and the follower 190 is integrally formed as a single piece with the movable clamp member 174. The adapter 150 further includes a resilient member (e.g., a compression spring 198) that biases the movable clamp member 174 away from the fixed clamp member 170 and toward the open position.

The handles 142a-142c are sized to maintain a generally consistent spacing between parallel axes 202, 206 of the power tool 114 and the dust collector 110, respectively (FIG. 8) so that a tool bit 210 attached to a chuck 214 of the power tool 114 (FIGS. 5-7), irrespective of the size of the particular power tool 114 used with the dust collector 110, is positioned in the same location relative to the dust collector 110.

With continued reference to FIGS. 5-7, the dust collector 110 and the power tool 114 include respective power tool battery packs 218, 222, each of which may be interchangeably coupled with the power tool 114 and the dust collector 110 for separately powering the power tool 114 and the dust collector 110, respectively. In other words, the dust collector 110 and the power tool 114 may be independently powered using identical battery packs 218, 222. Such battery packs 218, 222 may be 12-volt power tool battery packs 218, 222 that include three lithium-ion battery cells. Alternatively, the battery packs 218, 222 may each include fewer or more battery cells to yield any of a number of different output voltages (e.g., 14.4 volts, 18 volts, etc.). Additionally or alternatively, the battery cells may include chemistries other than lithium-ion such as, for example, nickel cadmium, nickel metal-hydride, or the like.

Figure 14:
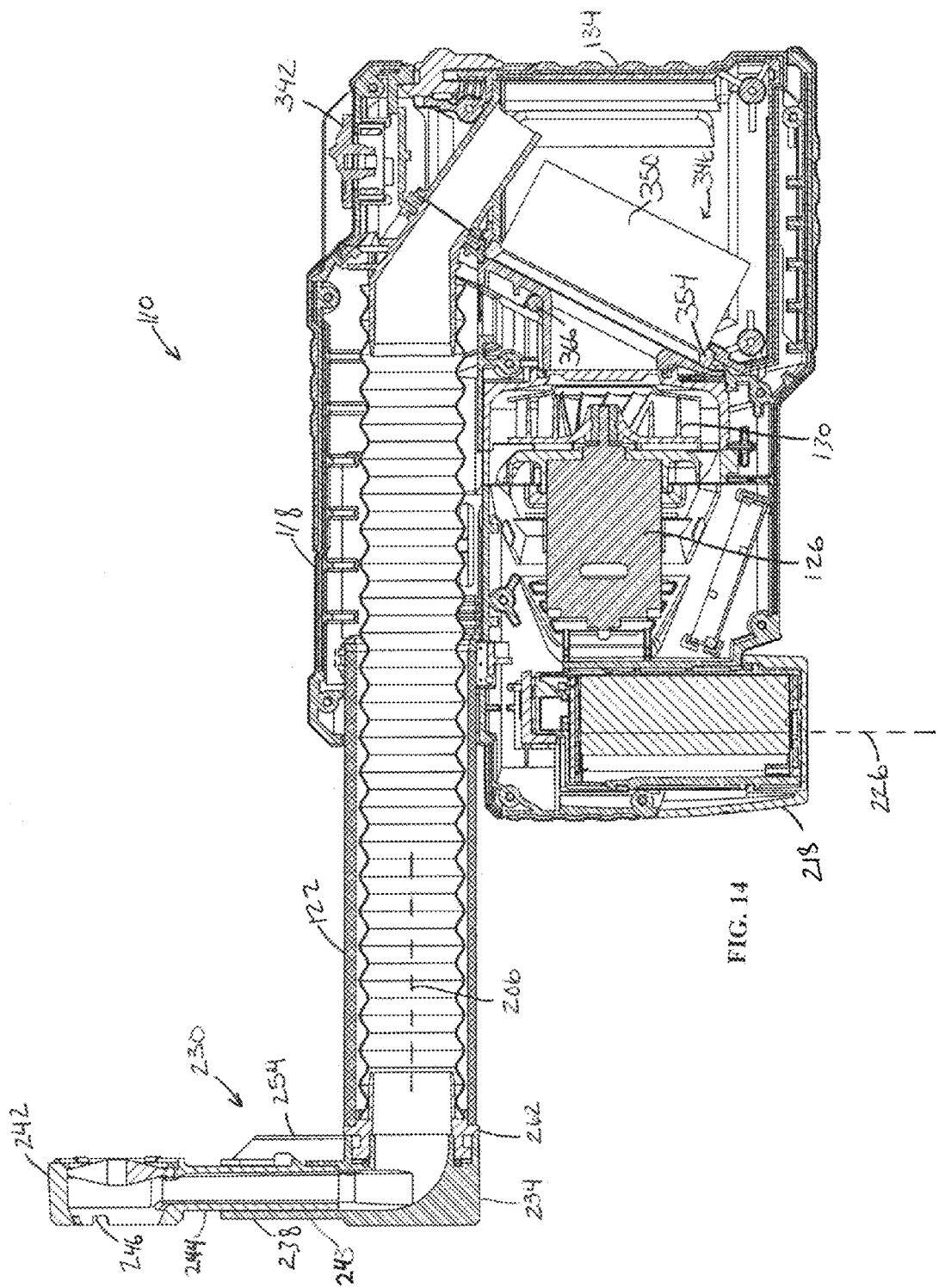
FIG. 14 is a longitudinal cross-sectional view of the dust collector of FIG. 5.

With reference to FIG. 14, the battery pack 218 is removably coupled to the dust collector 118 housing along an axis 226 that is oriented substantially normal to the axis 206 of the dust collector 110. As such, the battery pack 218 is substantially isolated from the axial impacts imparted by the power tool 114 along the power tool axis 202. In an alternative embodiment of the dust collector 110 in which such axial impacts imparted by the power tool 114 are not of concern, the battery pack 218 may be oriented substantially parallel with the axis 206 of the dust collector 110.

With reference to FIGS. 5-7, the dust collector 110 includes a suction head 230 coupled to the end of the suction pipe 122. The suction head 230 includes a hub 234, a hollow arm 238 extending from a side of the hub 234, and a shroud 242 coupled to the end of the arm 238. In the illustrated embodiment of the dust collector 110, the arm 238 includes a first portion 243 integrally formed with the hub 234 and a second portion 244 integrally formed with the shroud 242 (FIG. 12). The second portion 244 is received in the first portion 243 by way of a snap-fit; however, the second portion 244 may be retained to the first portion 243 in any of a number of different ways.

The shroud 242 defines a stepped suction inlet 246 (FIG. 5) through which air is drawn in during operation of the dust collector 110. When the suction inlet 246 is in contact with a workpiece during a drilling operation, the shroud 242 encloses a portion of the tool bit 210 and the surrounding region of the work piece to maintain the region at a sub-atmospheric pressure. In other words, the vacuum created in the suction pipe 122 and the suction head 230 draws dust and other debris generated during the drilling and/or hammering operation from the shroud 242, through the suction pipe 122, for depositing in the container 134.

Figure 10:
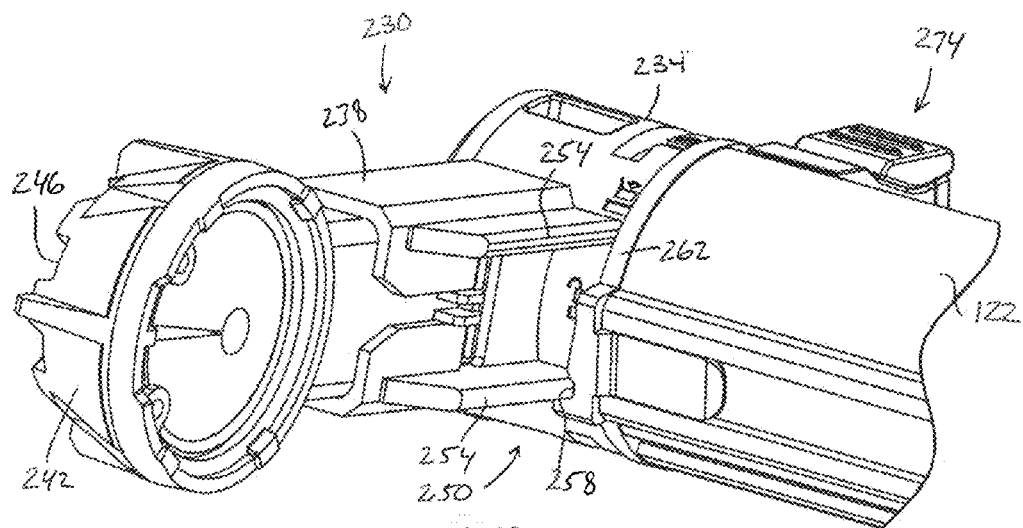
FIG. 10 is an enlarged, front perspective view of the dust collector of FIG. 5, illustrating a suction head rotated to a first position relative to a suction pipe.
Figure 11:
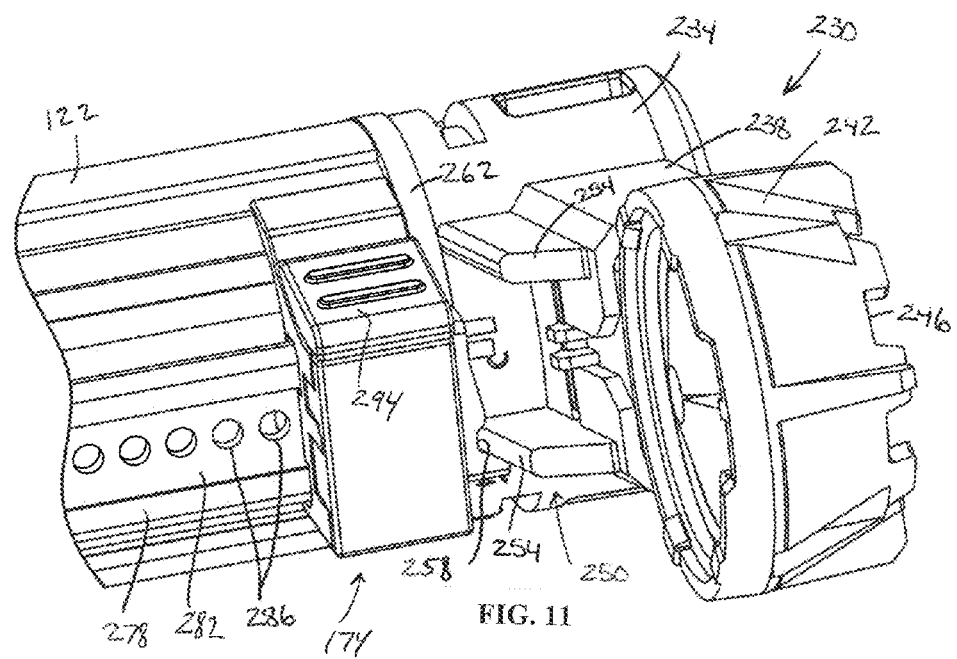
FIG. 11 is an enlarged, front perspective view of the dust collector of FIG. 5, illustrating the suction head rotated to a second position relative to the suction pipe.

As shown in FIGS. 10 and 11, the suction head 230 may be attached to the suction pipe 122 in two different orientations to accommodate placement of the power tool 114 on both sides of the dust collector 110. A detent arrangement 250 is utilized to maintain the suction head 230 in either of the positions shown in FIGS. 10 and 11. Particularly, the detent arrangement 250 includes two detent members 254 formed on the arm 238 and two detent recesses 258 located on opposite sides of the suction pipe 122 (with respect to the axis 206). In the illustrated embodiment of the detent arrangement 250, the detent members 254 are radially extending ribs integrally formed with the arm 238, and the detent recesses 258 are defined in an end cap 262 attached to the end of the suction pipe 122. When the detent members 254 are received in their respective recesses 258, the suction head 230 is rigidly maintained in position. To re-orient the suction head 230 from one side of the suction pipe 122 to the other, the user of the dust collector 110 needs only to apply a slight torque or a rotational force to the suction head 230 to overcome the friction between the detent members 254 and the end cap 262 for removing the detent member 254 from its respective detent recess 258. Alternatively, the detent arrangement 250 may be configured in any of a number of different ways for securing the suction head 230 in the positions shown in FIGS. 10 and 11.

With reference to FIG. 12, the dust collector 110 includes a nozzle 266 interchangeably coupled to the suction pipe 122 with the suction head 230. Particularly, the nozzle 266 includes a hub 270 having an identical configuration as the hub 234 of the suction head 230. As such, the nozzle 266 is attachable and removable from the suction pipe 122 in the same manner as the suction head 230. As is described in more detail below, the nozzle 266 facilitates usage of the dust collector 110 without the power tool 114 as a stand-alone vacuum device.

Figure 18:
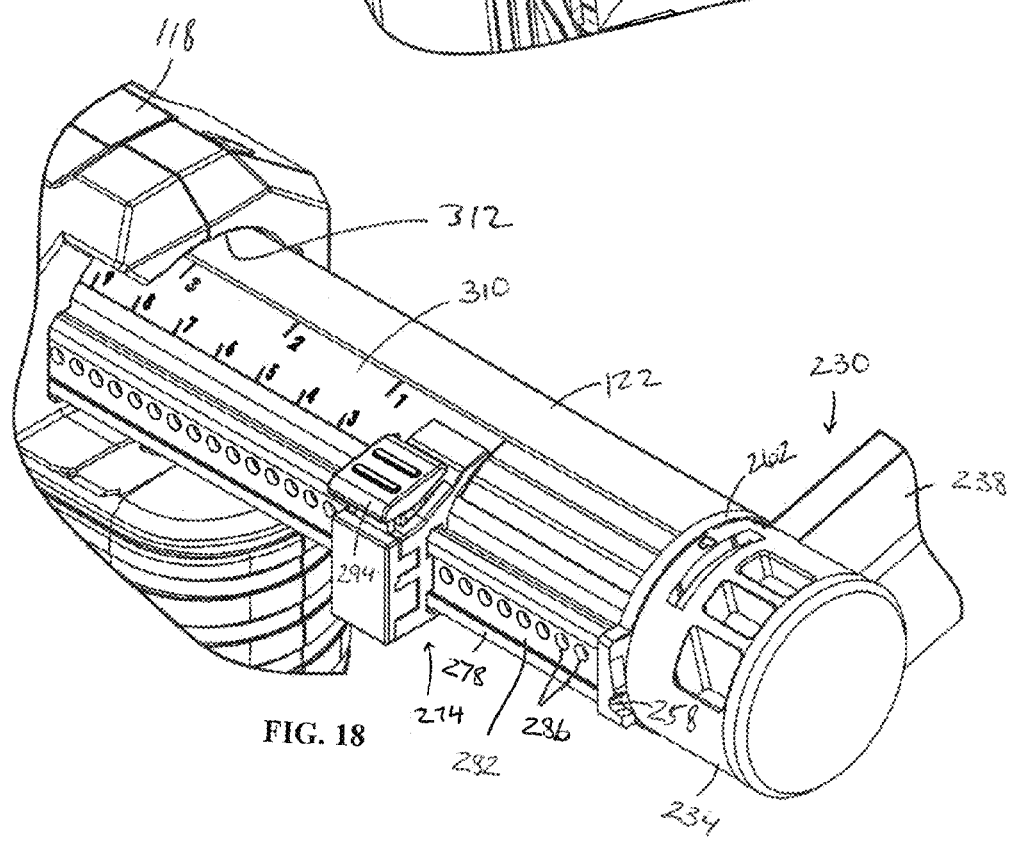
FIG. 18 is an enlarged, perspective view of the dust collector of FIG. 5 illustrating a plunge depth stop with an attached ruler that are movable as a unit relative to the suction pipe.
Figure 19:
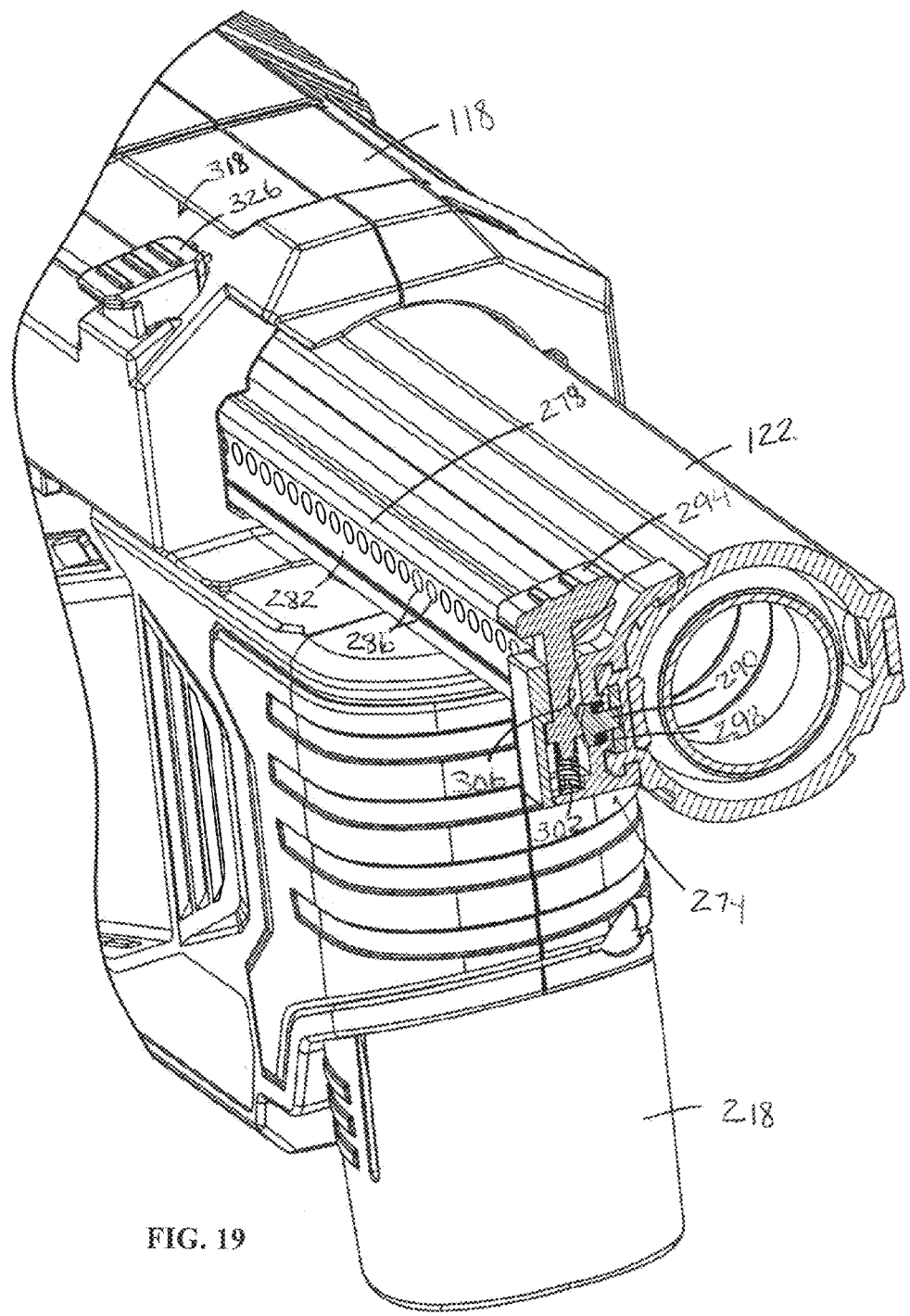
FIG. 19 is an enlarged, cross-sectional view of the dust collector of FIG. 5 illustrating the plunge depth stop secured to the telescoping suction pipe.

With reference to FIGS. 18 and 19, the dust collector 110 includes a plunge depth stop 274 movable along the length of the suction pipe 122 and selectively fixed to the suction pipe 122 to limit the extent to which the suction pipe 122 may telescope relative to the housing 118. The suction pipe 122 includes a rail 278 along which the depth stop 274 is movable, and a detent plate 282 including spaced apertures 286 along the length of the plate 282 is received within the rail 278. The depth stop 274 includes a pin 290 (FIG. 19) that is receivable in one of the apertures 286 in the detent plate 282 to secure the depth stop 274 to the suction pipe 122, and an actuator 294 for selectively moving the pin 290 relative to the detent plate 282 for inserting and removing the pin 290 from one of the apertures 286. The pin 290 is normally biased away from the detent plate 282 by a resilient member (e.g., a compression spring 298). Likewise, the actuator 294 is normally biased upward from the frame of reference of FIG. 19 by a resilient member (e.g., a compression spring 302). The actuator 294 includes a cam profile 306 which, in response to the actuator 294 being released from an initial depressed position, displaces the pin 290 toward the detent plate 282 against the bias of the spring 298. To reposition the depth stop 274 relative to the suction pipe 122, the actuator 294 is depressed against the bias of the spring 302 until the cam profile 306 is aligned with the pin 290, thereby permitting the pin 290 to be pushed away from the detent plate 282 (thereby removing the pin 290 from one of the apertures 286) by the spring 298.

With reference to FIG. 18, the dust collector 110 also includes a ruler 310 coupled for movement with the depth stop 274. As such, the plunge depth of the suction tube 122 may be set with reference to markings on the ruler 310 and a reference datum 312 on the housing 118 (e.g., a line or edge on the front of the housing 118 surrounding the suction pipe 122). For example, should the user of the dust collector 110 and the power tool 114 desire to plunge the tool bit 210 only two inches into a workpiece, the user would slide the depth stop 274 relative to the suction tube 122 until the "2 inch" marking on the ruler 310 is in alignment with the reference datum 312 on the housing 118. Thereafter, the suction pipe 122 is limited to retracting only two inches into the housing 118 before the depth stop 274 contacts the housing 118 at which time further retraction of the suction pipe 122 is halted.

Figure 15:
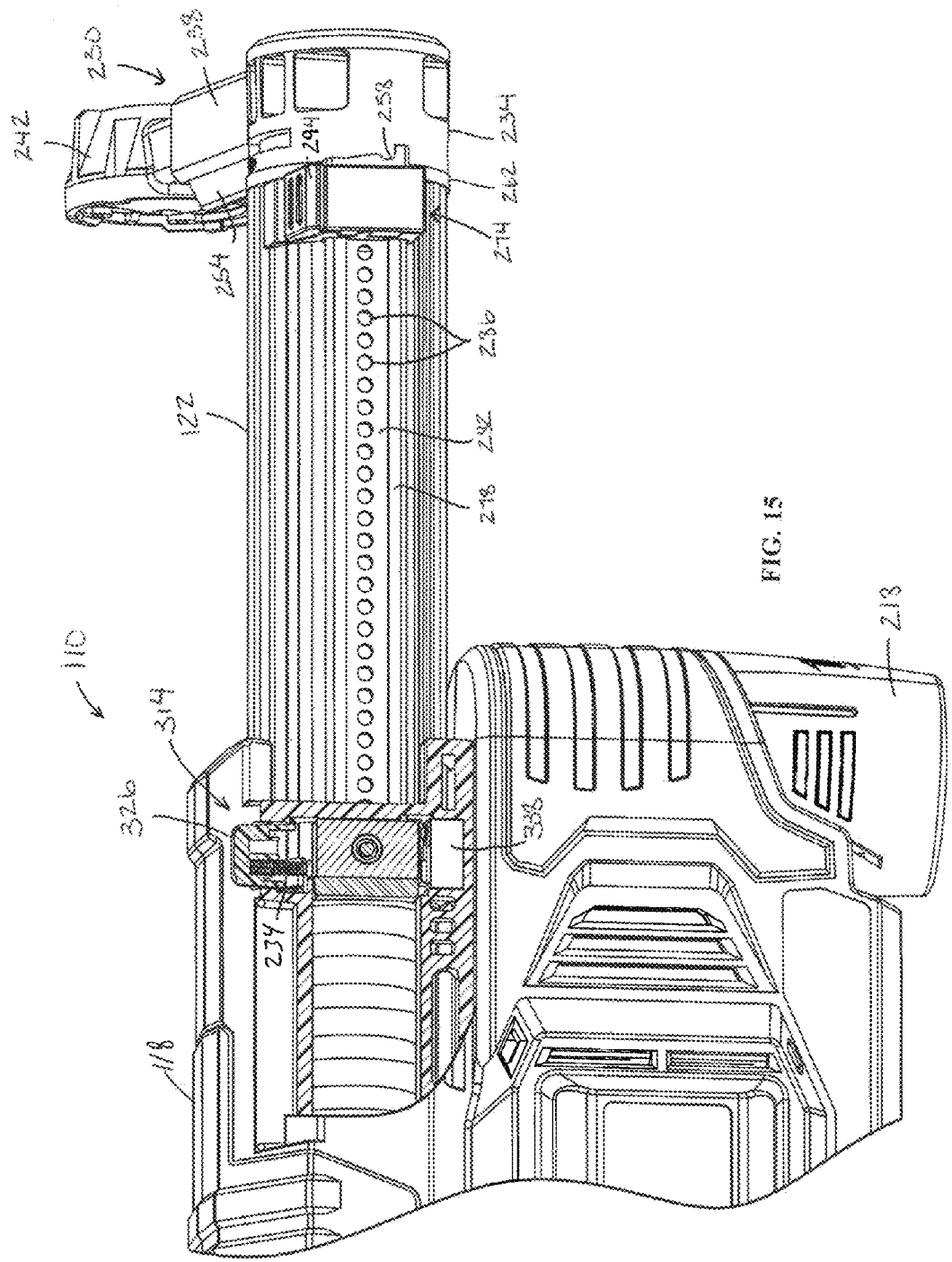
FIG. 15 is an enlarged, perspective view of the dust collector of FIG. 5 exposing the rear of the telescoping suction pipe with the suction pipe in an extended position.

With reference to FIG. 15, the dust collector 110 includes an extension stop 314 movable along the length of the suction pipe 122 and selectively fixed to the suction pipe 122 to limit the extent to which the suction pipe 122 may extend from the housing 118 (i.e., by contacting an interior surface of the housing 118). Particularly, the extension stop 314 is nearly structurally identical to the plunge depth stop 274 and therefore may be selectively secured along the rail 278 of the suction tube 122 in a similar manner as the plunge depth stop 274. However, the extension stop 314 includes a two-piece actuator 318 with a first portion 322 (which includes the cam profile) being attached with the remainder of the extension stop 314 to the suction pipe 122 for telescoping movement with the suction pipe 122, and a second portion 326 that is stationary on the housing 118. The second portion 326 includes a plunger 330 that is engageable with the first portion 322 to release the extension stop 314 from the suction pipe 122. A resilient member (e.g., a compression spring 334) biases the second portion 326 of the actuator 318 upward from the frame of reference of FIG. 15 such that the second portion 326 is normally clear of the remainder of the extension stop 314 as the stop 314 moves with extension and retraction of the suction pipe 122.

Figure 16:
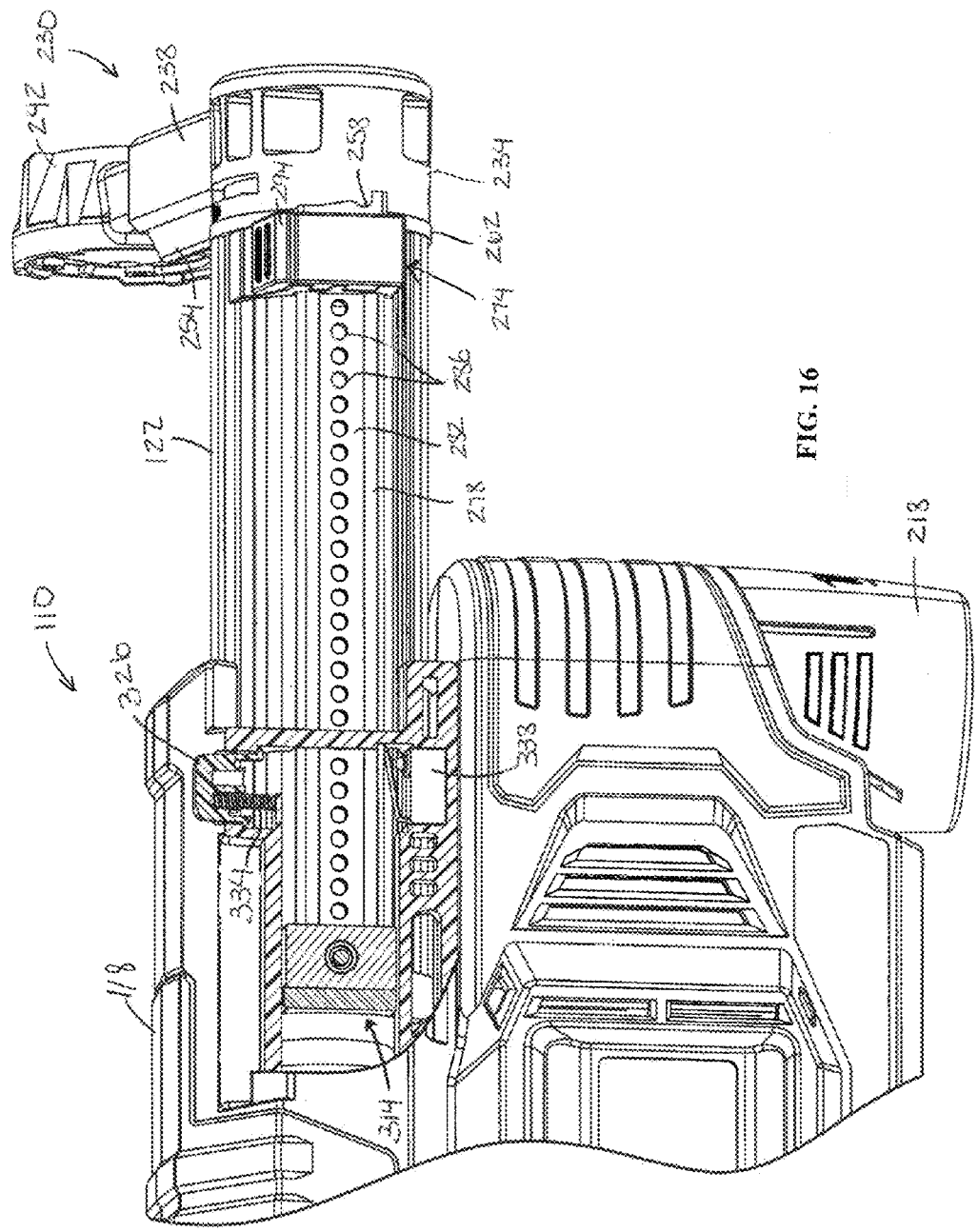
FIG. 16 is an enlarged, perspective view of the dust collector of FIG. 5 exposing the rear of the telescoping suction pipe with the suction pipe in a retracted position.
Figure 17:
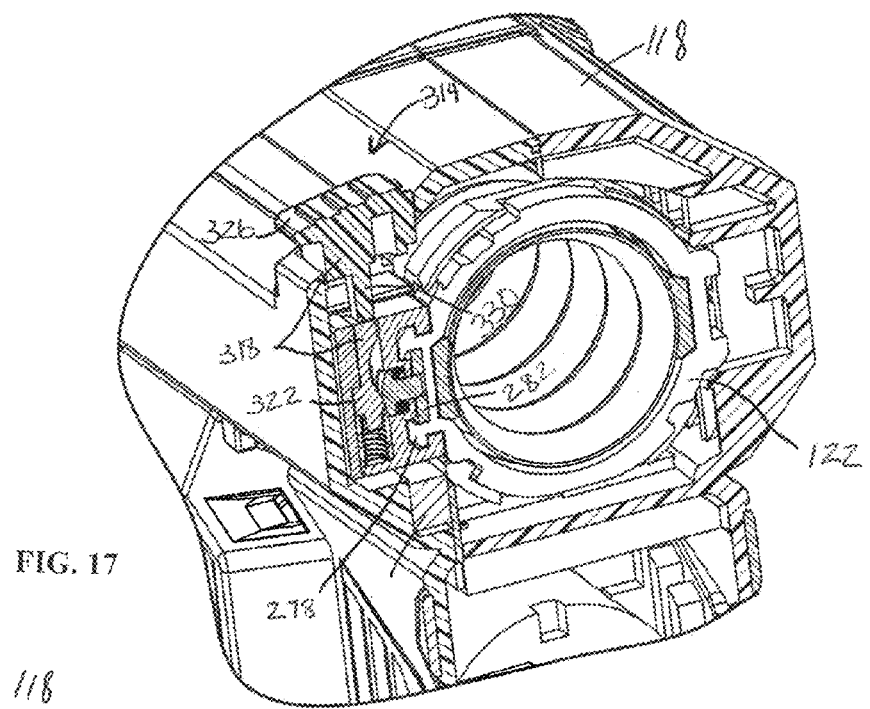
FIG. 17 is an enlarged, cross-sectional view of the dust collector of FIG. 5 illustrating an extension stop secured to the telescoping suction pipe.

With reference to FIGS. 15 and 16, the dust collector 110 further includes a first switch 338 electrically connecting the motor 126 with a power source (e.g., the battery pack 218) to activate the motor 126 in response to detecting telescoping movement of the suction pipe 122 relative to the housing 118. The dust collector 110 also includes a controller (not shown) electrically connected between the switch 338 and the battery pack 218, and a second switch 342 (FIG. 6) electrically connected with the motor 126, the battery pack 218, and the first switch 338 via the controller. The second switch 342 is toggled between a first switching position in which the electric motor 126 remains deactivated irrespective of actuation of the first switch 338, a second switching position in which the electric motor 126 may be activated and deactivated automatically in response to actuation of the first switch 338, and a third switching position in which the electric motor 126 may be activated irrespective of actuation of the first switch 338. In the illustrated embodiment of the dust collector 110, the second switch 342 is configured as a slide switch. Alternatively, the second switch 342 may be configured in any of a number of different ways to accommodate the first, second, and third switching positions. The second switch 342 may be toggled to either of the first switching position or the third switching position when using the dust collector 110 as a stand-alone unit in conjunction with the stand-alone nozzle 266 shown in FIG. 12. The first, second, and third switching positions of the second switch 342 may occur in any sequential order depending upon the configuration of the switch 342.

In the illustrated embodiment of the dust collector 110 shown in FIG. 15, with the second switch 342 toggled to the second or "automatic" switching position, the first switch 338 (e.g., a microswitch configured as a normally closed switch) is maintained in an open state when contacted by the extension stop 314. As such, the controller will not supply current from the battery pack 218 to the motor 126 to activate the motor 126 so long as the suction pipe 122 is fully extended from the housing 118, at least to an extent permitted by the extension stop 314. However, in response to the suction pipe 122 retracting into the housing 118 (which is indicative of the start of a drilling operation by the power tool 114), the first switch 338 detects this movement when it loses contact with the extension stop 314, thereby actuating the first switch 338 to a closed state. The controller then supplies current from the battery pack 218 to the motor 126 to activate the motor 126 to draw a vacuum through the suction pipe 122 and the suction head 230 as long as the suction pipe 122 remains in a retracted position relative to the housing 118.

In a first manner of operating the dust collector 110, the controller initiates a timer upon the first switch 338 detecting movement of the suction pipe 122 from the fully extended position to a retracted position. If the suction pipe 122 is maintained in a retracted position for a predetermined amount of time (e.g., at least one second), the controller maintains activation of the motor 126 for another predetermined amount of time (e.g., four seconds) subsequent to the suction pipe 122 returning to its fully extended position so that dust and other debris within the suction pipe 122 may be cleared and deposited in the dust container 134 after completion of a drilling operation and removal of the dust collector 110 from the workpiece. If the suction pipe 122 is not maintained in a retracted position for at least one second, for example, the controller immediately deactivates the motor 126 in response to the suction pipe 122 returning to its fully extended position.

In a second manner of operating the dust collector 110, rather than immediately activating the motor 126 in response to retraction of the suction pipe 122, the controller initiates a timer upon the first switch 338 detecting movement of the suction pipe 122 from the fully extended position to a refracted position. The controller activates the motor 126 only after a predetermined amount of time (e.g., a fraction of a second) lapses with the suction pipe 122 maintained in the retracted position. As a result, inadvertent "bumps" or contact with the suction pipe 122 that might otherwise cause slight refraction of the suction pipe 122 are ignored by the controller, thereby maintaining the motor 126 in a deactivated state and conserving power in the battery pack 218.

Also, rather than immediately deactivating the motor 126 when the suction pipe 122 is returned to its fully extended position, the controller maintains activation of the motor 126 for a period of time (e.g., a fraction of a second or more) in response to the first switch 338 resuming contact with the extension stop 314, at which time the first switch 338 is actuated to an open state. As a result, dust and other debris within the suction pipe 122 may be cleared and deposited in the dust container 134 after completion of a drilling operation and removal of the dust collector 110 from the workpiece.

Figure 13:
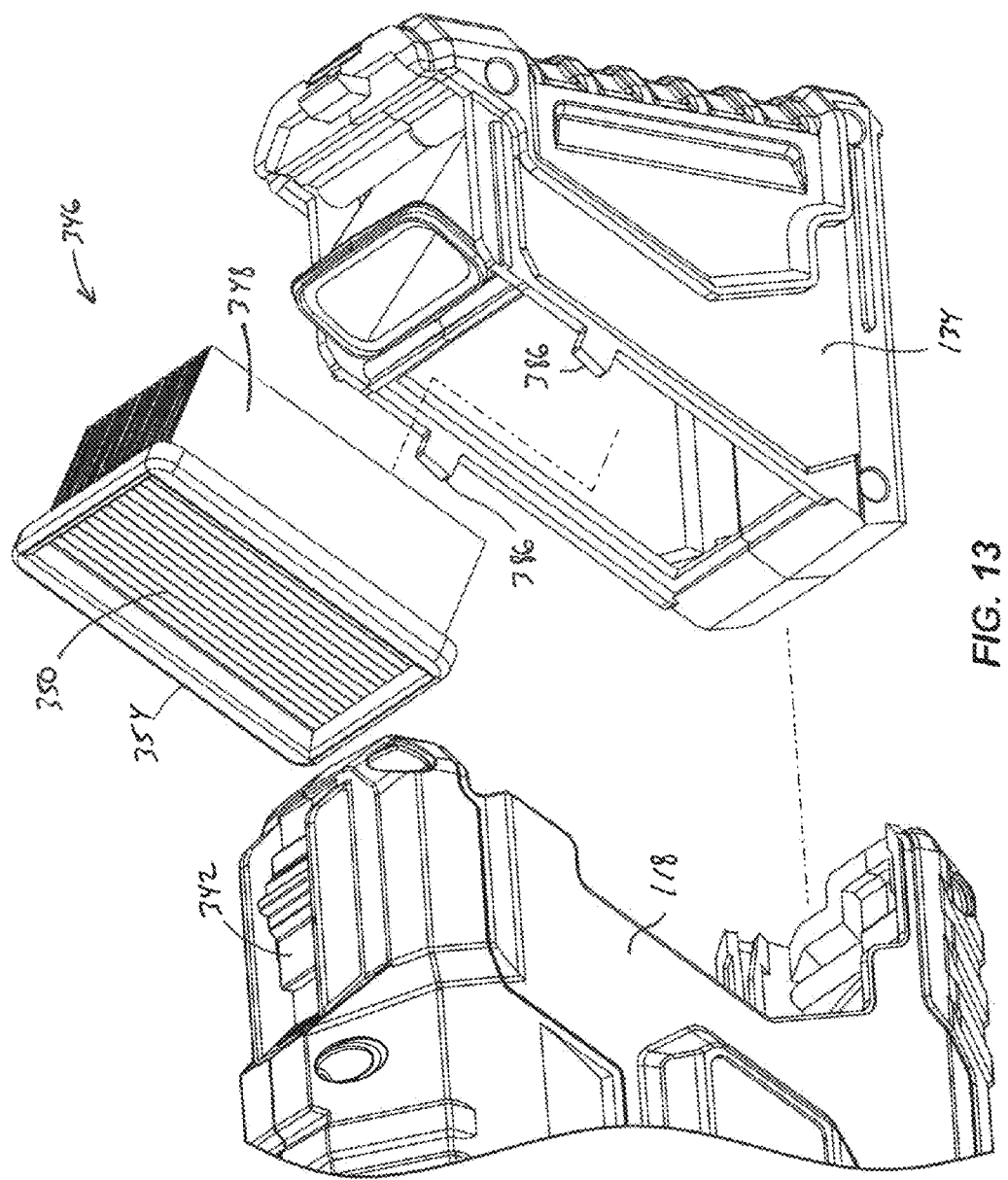
FIG. 13 is an enlarged, exploded perspective view of the dust collector of FIG. 5, illustrating a dust container and a filter.

With reference to FIG. 13, the dust collector 110 includes a filter 346 supported by at least one of the housing 118 and the dust container 134. In the illustrated embodiment of the dust collector 110, the filter 346 includes a plastic housing 348, a pleated element 350 within the housing 348, and a rim 354 surrounding the pleated element 350. The rim 354 is trapped between the dust container 134 and the housing 118 when the dust container 134 is attached to the housing 118. Alternatively, the dust collector 134 may incorporate additional structure for securing the filter 346 to the dust container 134 prior to the dust container 134 being attached to the housing 118. When the dust container 134 is removed from the housing 118, the filter 346 is accessible and removable from the dust container 134 for servicing and/or replacement by merely pulling the filter 346 (by, for example, grasping the rim 354) from the dust container 134 after the dust container 134 has been removed or detached from the housing 118. The filter 346 may be configured as a high efficiency particulate air ("HEPA") filter 346.

With reference to FIG. 14, the filter 346 is oriented within the dust container 134 in an inclined or an oblique manner relative to the axis 206 of the dust collector 110. As such, it is expected that at least a portion of the filter 346 will remain exposed when the dust container 134 is nearly filled with dust, regardless of the orientation of the dust collector 110 while in use. Particularly, the pleated element 350 of the filter 346 extends into the interior of the dust container 134, and at least a portion of the pleated element 350 is expected to remain exposed when the dust container 134 is nearly filled with dust, regardless of the orientation of the dust collector 110 while in use. Optionally, the dust collector 110 may include a secondary filter (e.g., a porous plate, a screen, etc.) positioned between the fan 130 and the filter 346 to inhibit particles that may have bypassed the filter 346 from being impacted by the fan 130. Such a secondary filter may be permanently affixed to the housing 118 and non-removable from the housing 118. Such a secondary filter may also include a fine pore size, such that any particles bypassing both the filter 346 and the secondary filter are sufficiently small to not damage the fan 130.

Figure 20:
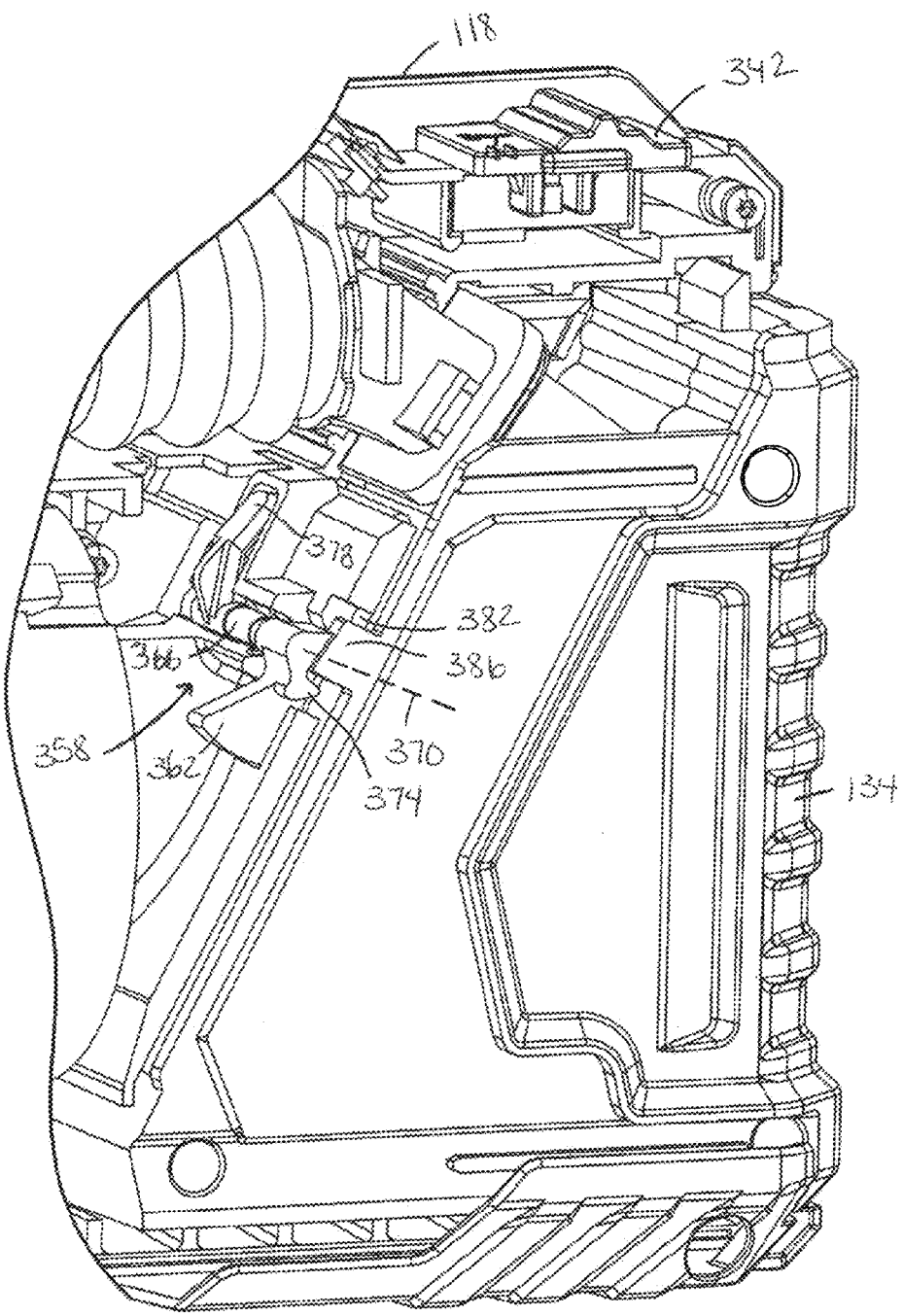
FIG. 20 is an enlarged, perspective view of the dust collector of FIG. 5 illustrating a cutaway to expose a detector that prevents attachment of a dust container to the housing of the dust collector without an accompanying filter.

With reference to FIG. 20, the dust collector 110 includes a detector 358 coupled to the housing 118 and biased toward a first position in which a first arm 362 of the detector 358 protrudes from the housing 118 to prevent the dust container 134 from being coupled to the housing 118 in absence of the filter 346. The first arm 362 is retractable into the housing 118 in response to the detector 358 being moved to a second position by the filter 346 when the filter 346 is present, thereby permitting the container 134 to be coupled to the housing 118. Particularly, in the illustrated embodiment of the dust collector 110, the detector 358 is pivotably supported by the housing 118 at a location upstream of the suction fan 130. The detector 358 includes a shaft 366 defining a rotational axis 370 about which the detector 358 is pivotable, the first arm 362 that extends radially from the shaft 366, a finger 374 positioned adjacent the first arm 362, and a second arm 378 that extends radially from the shaft 366 and that is axially spaced from the first arm 362. The detector 358 is configured as a single, unitary component. Alternatively, the various features of the detector 358, including the first arm 362, the second arm 378, and the finger 374, may be separate from each other.

The first arm 362 is located on the shaft 366 such that the first arm 362 is generally aligned with one of the segments of the rim 354 when the filter 346 is situated in an installed position in the dust container 134. As such, when the pre-assembled filter 346 and dust container 134 are moved into position for attachment to the housing 118, the first arm 362 is engaged by the rim 354, therefore causing the detector 358 to pivot about the axis 370. A resilient member (e.g., a compression spring, not shown) is positioned between the housing 118 and the second arm 378 for biasing the detector 358 to a position in which the first arm 362 protrudes from the housing 118 in absence of the filter 346.

With continued reference to FIG. 20, the finger 374 is in alignment with a window or an aperture 382 in the housing 118 through which an alignment 386 tab on the dust container 134 is receivable when the pre-assembled filter 346 and dust container 134 are attached to the housing 118. In absence of the filter 346 and dust container 134, the spring biases the finger 374 to a pivoted position in which it at least partially protrudes into the aperture 182. Should the user of the dust collector 110 attempt to attach the dust container 134 without the filter 346 being in position, the spring will maintain the shaft 366 in a pivoted position in which the first arm 362 protrudes from the housing 118 and the finger 374 at least partially protrudes into the aperture 382. As such, the finger 374 prevents the alignment tab 386 from being received in the aperture 382, thereby preventing attachment of the dust container 134 to the housing 118.

However, when the pre-assembled filter 346 and dust container 134 are moved into position for attachment to the housing 118, the first arm 362 is engaged by the rim 354, thereby causing the shaft 366 to pivot about the axis 370 and remove the finger 374 from the aperture 382. The alignment tab 386 on the dust container 134 may then be fully received within the aperture 382 for attaching and subsequently securing the dust container 134 to the housing 118.

Figure 21:
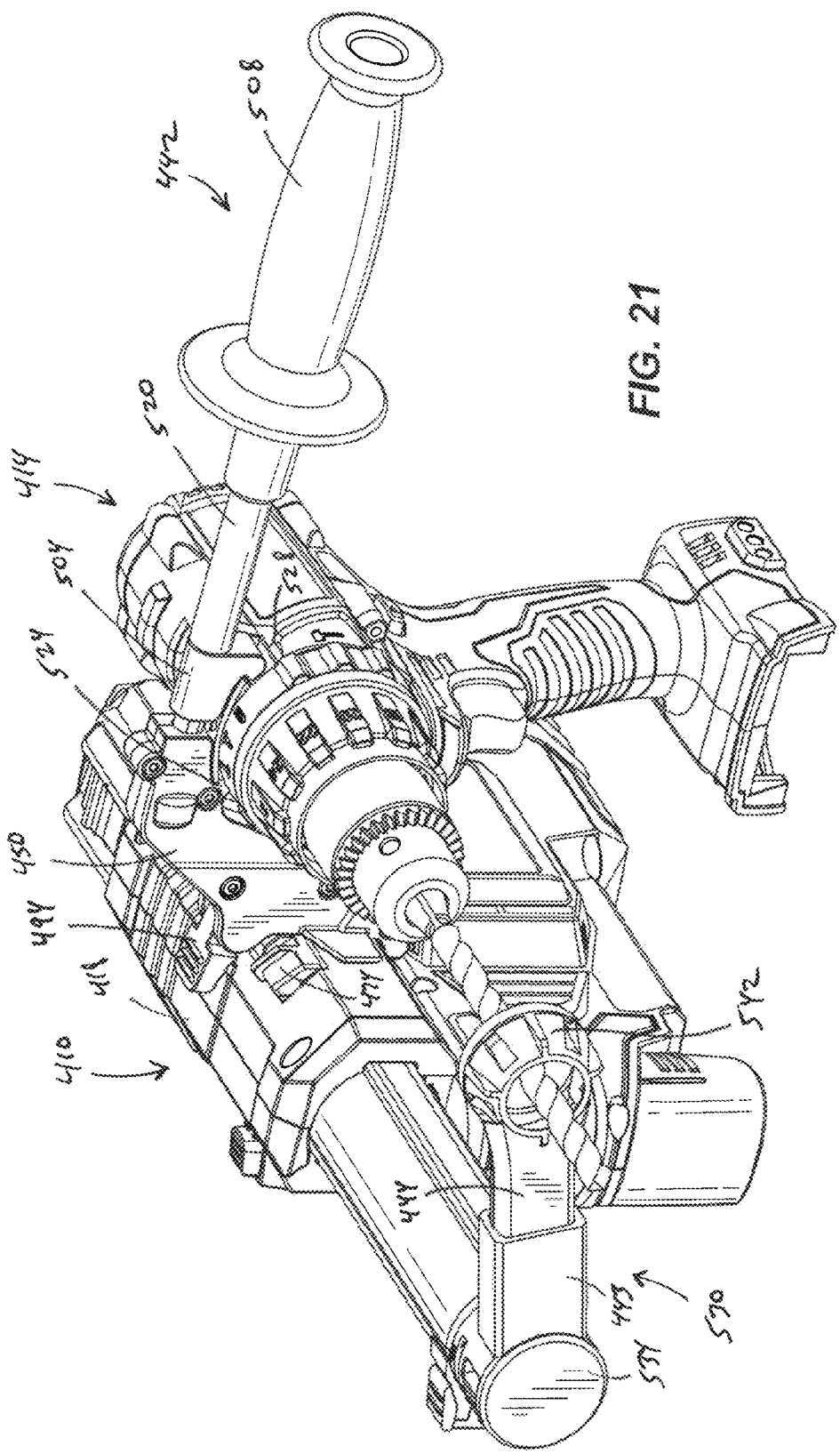
FIG. 21 is a front perspective view of a dust collector in accordance with yet another embodiment of the invention attached to a rotary power tool.
Figure 22:
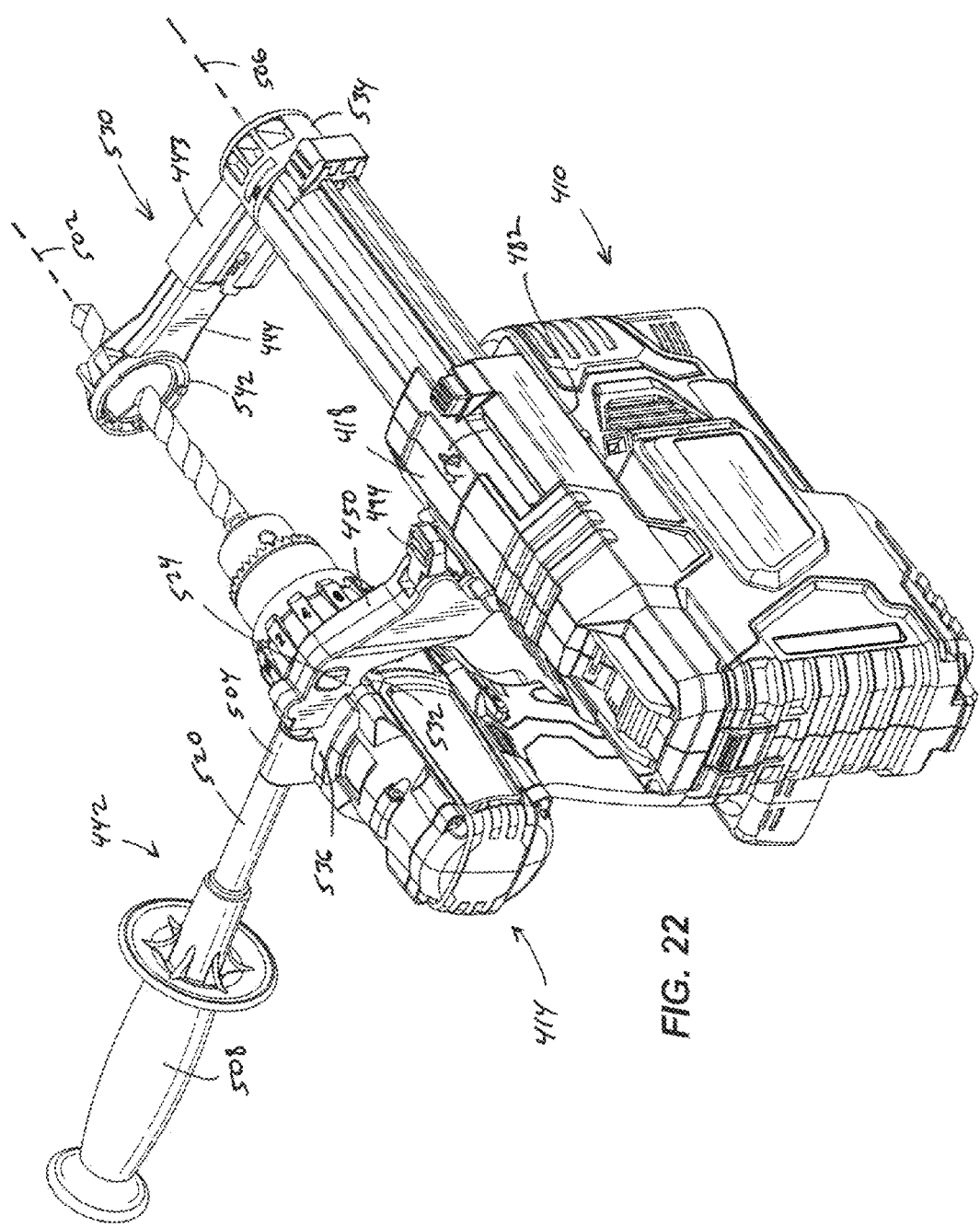
FIG. 22 is a rear perspective view of the dust collector and rotary power tool of FIG. 21.

FIGS. 21 and 22 illustrate a dust collector 410 in accordance with yet another embodiment of the invention for use with a hand-held rotary power tool 414 (e.g., a hammer drill). The dust collector 410 is substantially identical to the dust collector 110 described above and shown in FIGS. 5-20. As such, like components and features are identified with like reference numerals plus "300."

Figure 23:
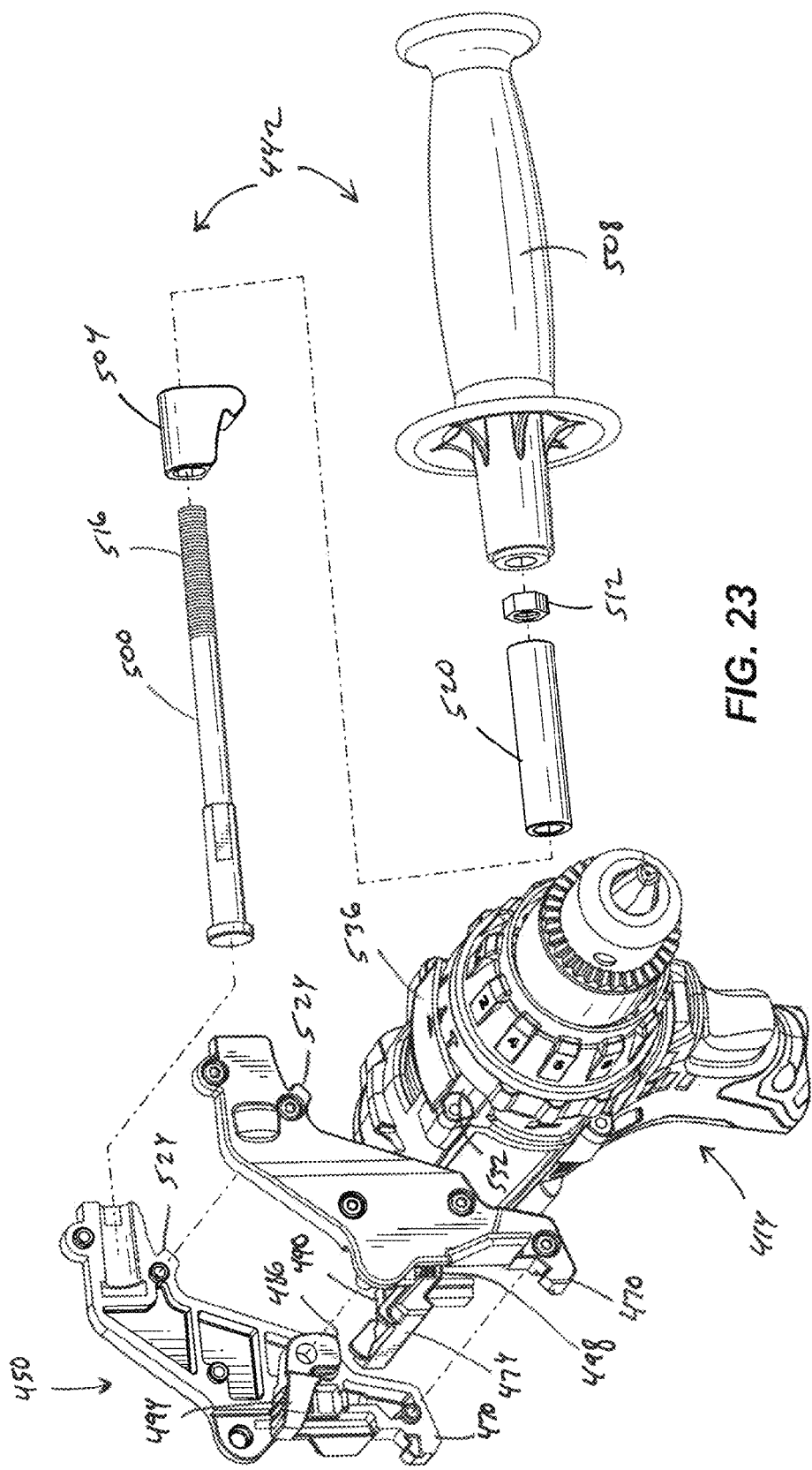
FIG. 23 is an exploded, front perspective view of the dust collector and rotary power tool of FIG. 21.

The dust collector 410 includes an adapter 450 and an auxiliary handle 442 for supporting the power tool 414 in a side-by-side relationship with the dust collector 410 (FIGS. 21 and 22). The adapter 450 includes a fixed clamp member 470 and an opposed, movable clamp member 474 for clamping the adapter 450 to either side of the housing 418 (FIG. 23). Particularly, the fixed clamp member 470 is received within a first notch 482 in the housing 418, and the movable clamp member 474 is received within a second notch 478 in the housing 418 (FIG. 22). The notches 478, 482 are defined in each side of the housing 418 to clamp the adapter 450 to either side of the housing 418. With reference to FIG. 23, the adapter 450 also includes a cam 486 and a follower 490 for actuating the movable clamp member 474 between an open position in which it is displaced from the second notch 478 and disengaged from the housing 418, and a closed position in which the movable clamp member 474 is received within the second notch 478 and engaged with the housing 418. In the illustrated embodiment of the adapter 450, the cam 486 is integrally formed as a single piece with a lever 494, and the follower 490 is integrally formed as a single piece with the movable clamp member 474. The adapter 450 further includes a resilient member (e.g., a compression spring 498) that biases the movable clamp member 474 away from the fixed clamp member 470 and toward the open position.

With continued reference to FIG. 23, the handle 442 includes a shaft 500 extending from the adapter 450, a clamp member 504 movable along and relative to the shaft 500, a grip 508 having a threaded insert 512 engageable with a threaded portion 516 of the shaft 500, and a spacer 520 positioned between the movable clamp member 504 and the grip 508. The adapter 450 includes a fixed clamp member 524 opposite and in facing relationship with the movable clamp member 504. The clamp members 504, 524 are received in corresponding notches 528, 532 in a portion of the power tool 414 (e.g., a transmission housing 536) to thereby clamp the power tool 414 between the movable clamp member 504 and the fixed clamp member 524. Particularly, as the grip 508 is threaded to the shaft 500 (i.e., via the threaded insert 512), the spacer 520 displaces the movable clamp member 504 along the shaft 500 toward the fixed clamp member 524, thereby progressively increasing the clamping force exerted on the power tool 414.

With reference to FIGS. 21 and 22, the dust collector 410 also includes a suction head 530 longer than that shown in the dust collector 10 of FIGS. 5 and 6 to account for a greater distance between the parallel axes 502, 506 of the power tool 414 and the dust collector 410. Particularly, the hub 534 and first arm portion 443 of the suction head 530 are used with a shroud 542 having an elongated second arm portion 444. In other words, the second arm portion 444 of the suction head 530 is longer than that of the suction head 230 shown in FIGS. 5 and 6. The second arm portions 244, 444 with accompanying shrouds 242, 542 may be interchanged by manipulating the snap-fit between the arm portions 243, 244 and 443, 444 depending upon what type of power tool with which the dust collector 410 is used (i.e., the rotary hammer of FIGS. 5 and 6 or the hammer drill of FIGS. 21 and 22). Alternatively, the first arm portion 243, 244 may include multiple (i.e., at least two) detent recesses 245 (FIG. 12) with which to use with the snap-fit between the arm portions 243, 244 and 443, 444 depending upon what type of power tool with which the dust collector 410 is used (i.e., the rotary hammer of FIGS. 5 and 6 or the hammer drill of FIGS. 21 and 22). Accordingly, the arm portions 244, 444 may telescope relative to the arm portions 243, 443 in particular increments determined by the spacing between the detent recesses 245 to lengthen or shorten the suction heads 230, 530.

Various features of the invention are set forth in the following claims.

What is claimed is:

1. A power tool assembly, comprising:
a hand-held power tool;
a dust collector removably coupled to the power tool, the dust collector including
a housing,
a telescoping suction pipe coupled to the housing,
an electric motor positioned in the housing,
a suction fan driven by the electric motor and operable to generate a vacuum in the suction pipe,
a dust container coupled to the housing and positioned upstream of the suction fan, and
a high efficiency particulate air filter supported by at least one of the housing or the dust container, the filter being removable from the one of the housing or the dust container for at least one of servicing and replacement; and
first and second power tool battery packs each of which is interchangeably coupled with the power tool and the dust collector for separately powering the power tool and the dust collector for concurrent operation of the power tool and the dust collector.

2. The power tool assembly of claim 1, wherein the first and second power tool battery packs are identical.

3. The power tool assembly of claim 1, wherein the power tool and the dust collector are coupled in a side-by-side relationship.

4. The power tool assembly of claim 1, wherein each of the first and second battery packs includes three lithium-ion battery cells.

5. The power tool assembly of claim 1, wherein the power tool is a rotary power tool.

6. The power tool assembly of claim 5, wherein the rotary power tool is one of a rotary hammer and a hammer drill.

7. The power tool assembly of claim 1, wherein the suction pipe is coupled to the housing for telescoping movement along a first axis, and wherein the second battery pack is removably coupled to the housing along a second axis oriented substantially normal to the first axis.

8. The power tool assembly of claim 7, wherein the power tool is a rotary power tool defining a rotational axis, and wherein the first axis is substantially parallel with the rotational axis of the power tool.

9. The power tool assembly of claim 1, wherein the dust collector further includes
an adapter including a first portion coupled to the housing and a second portion, and
an auxiliary handle coupled to the second portion of the adapter and the power tool, the adapter and the auxiliary handle supporting the power tool in a side-by-side relationship with the dust collector.

10. The power tool assembly of claim 9, wherein the housing includes a first side and an opposite second side, and wherein the first portion of the adapter is interchangeably connectable to the first and second sides of the housing to thereby support the power tool adjacent a chosen one of the first and second sides of the housing.

11. The power tool assembly of claim 10, further comprising a suction head coupled to a distal end of the suction pipe, wherein the suction head is repositionable between first and second orientations to accommodate placement of the power tool adjacent the first and second sides of the housing, respectively.

12. The power tool assembly of claim 11, wherein the suction head is pivotably coupled to the distal end of the suction pipe between the first and second orientations.

13. The power tool assembly of claim 12, further comprising a detent arrangement for maintaining the suction head in at least one of the first and second orientations.

14. The power tool assembly of claim 13, wherein the detent arrangement includes first and second detent members on the suction head, and first and second detent recesses positioned on opposite sides of the suction pipe, wherein the first detent member is received in the first detent recess to maintain the suction head in the first orientation, and wherein the second detent member is received in the second detent recess to maintain the suction head in the second orientation.

15. The power tool assembly of claim 14, further comprising an end cap coupled to the distal end of the suction pipe between the suction pipe and the suction head, wherein the first and second recesses are both defined in the end cap.

16. The power tool assembly of claim 10, wherein the adapter includes a fixed clamp member and an opposed, movable clamp member for clamping the adapter to one of the first and second sides of the housing.

17. The power tool assembly of claim 16, wherein each of the first and second sides of the housing includes a first notch in which the fixed clamp member is received, and a second notch in which the movable clamp member is received.

18. The power tool assembly of claim 17, wherein the adapter includes a cam and a follower for actuating the movable clamp member between an open position in which it is displaced from the second notch and disengaged from the housing, and a closed position in which the movable clamp member is received within the second notch and engaged with the housing.

19. The power tool assembly of claim 18, wherein the movable clamp member is integrally formed with the follower as a single piece.

20. The power tool assembly of claim 18, wherein the adapter includes a resilient member that biases the movable clamp member away from the fixed clamp member and toward the open position.

21. The power tool assembly of claim 9, wherein the auxiliary handle includes a cylindrical band received within an arcuate slot in the adapter and a rotatable grip for constricting and expanding the band, and wherein a neck of the power tool is clamped by the band.

22. The power tool assembly of claim 9, wherein the handle includes a shaft extending from the second portion of the adapter and a clamp member movable relative to the shaft, and wherein the power tool is clamped between the movable clamp member and the adapter.

23. The power tool assembly of claim 22, wherein the adapter includes a fixed clamp member, and wherein the power tool is clamped between the movable clamp member and the fixed clamp member.

24. The power tool assembly of claim 23, wherein the shaft includes a threaded portion, wherein the handle includes a grip having therein a threaded insert engaged with the threaded portion of the shaft, and wherein the movable clamp member is movable along the shaft in response to relative rotation between the grip and the shaft for clamping the power tool between the movable clamp member and the fixed clamp member.

25. The power tool assembly of claim 24, wherein the handle includes a spacer positioned between the movable clamp member and the grip.

26. The power tool assembly of claim 1, wherein the dust collector further includes
a switch electrically connecting the motor with the second battery to activate the motor in response to detecting telescoping movement of the suction pipe relative to the housing.

27. The power tool assembly of claim 26, wherein the switch is a first switch, wherein the dust collector further includes a second switch electrically connected with the motor, the second battery, and the first switch, and wherein the second switch is toggled between a first switching position in which the electric motor remains deactivated irrespective of actuation of the first switch, a second switching position in which the electric motor may be activated and deactivated automatically in response to actuation of the first switch, and a third switching position in which the electric motor may be activated irrespective of actuation of the first switch.

28. The power tool assembly of claim 27, further comprising:
a suction head removably coupled to the suction pipe, the suction head including a suction inlet through which a tool bit of the power tool is extendable, and
a nozzle interchangeably coupled to the suction pipe with the suction head, the nozzle being usable with the dust collector without the power tool when the second switch is in the third switching position.

29. The power tool assembly of claim 27, further comprising an extension stop adjustably coupled along the length of the suction pipe to limit an extent to which the suction pipe telescopes from the housing, wherein the first switch is actuated by the extension stop.

30. The power tool assembly of claim 29, wherein the first switch is a normally closed microswitch, and wherein the microswitch is actuated to an open state in response to contact with the extension stop.

31. The power tool assembly of claim 30, wherein the microswitch is actuated to a closed state in response to a loss of contact with the extension stop.

32. The power tool assembly of claim 26, wherein the suction pipe is telescopically movable relative to the housing from an extended position to a retracted position in response to being depressed against a workpiece, and wherein the switch electrically connects the motor with the second battery in response to the switch detecting movement of the suction pipe from the extended position to the retracted position.

33. The power tool assembly of claim 32, further comprising a controller electrically connected with the switch and the second battery.

34. The power tool assembly of claim 33, wherein the controller maintains activation of the motor for a period of time in response to the switch detecting movement of the suction pipe from the retracted position to the extended position for clearing dust from the suction pipe.

35. The power tool assembly of claim 34, wherein the controller initiates a timer upon detecting movement of the suction pipe from the extended position to the retracted position, and wherein the controller maintains activation of the motor for clearing dust from the suction pipe only after a predetermined amount of time lapses with the suction pipe maintained in the retracted position.

36. The power tool assembly of claim 1, wherein the filter is removably received in the dust container.

37. The power tool assembly of claim 36, wherein the dust container and the filter are removable from the housing as a unit.

38. The power tool assembly of claim 36, wherein the filter includes a pleated element and a rim surrounding the pleated element, and wherein the rim is trapped between the dust container and the housing when the dust container is attached to the housing.

39. The power tool assembly of claim 38, wherein the pleated element extends into an interior of the dust container.

40. The power tool assembly of claim 39, wherein the filter is oriented relative to the dust container in an inclined or an oblique manner relative to a longitudinal axis of the suction pipe.

41. The power tool assembly of claim 38, wherein the rim is accessible for grasping to facilitate removal of the filter from the dust container when the dust container is detached from the housing.

42. The power tool assembly of claim 1, wherein the dust collector further includes a detector coupled to the housing and biased toward a first position in which a portion of the detector protrudes from the housing to prevent the dust container from being coupled to the housing in absence of the filter, the protruding portion of the detector being retractable into the housing in response to the detector being moved to a second position by the filter when the filter is present, thereby permitting the dust container to be coupled to the housing.

43. The power tool assembly of claim 42, wherein the detector is pivotably supported by the housing at a location upstream of the suction fan.

44. The power tool assembly of claim 42, wherein the detector includes a shaft defining a rotational axis about which the detector is pivotable and an arm extending radially from the shaft, and wherein the arm is engaged with the filter when the filter is present.

45. The power tool assembly of claim 44, wherein the protruding portion is configured as a finger positioned adjacent the arm.

46. The power tool assembly of claim 45, wherein the housing includes an aperture aligned with the finger, and wherein the dust container includes an alignment tab that is receivable in the aperture when the pre-assembled filter and dust container are attached to the housing.

47. The power tool assembly of claim 46, wherein the finger is pivoted to a position in which it at least partially protrudes into the aperture in absence of the filter, thereby interfering with the alignment tab to prevent the dust container from being attached to the housing.

48. The power tool assembly of claim 1, wherein the power tool is a first power tool, and wherein the dust collector further includes
a handle assembly including
a first handle having a head portion with a first size for receiving a neck of a first power tool for supporting the first power tool in a side-by-side relationship with the dust collector, and
a second handle having a head portion with a second size for receiving a neck of a second power tool for supporting the second power tool in a side-by-side relationship with the dust collector, the necks of the first and second power tools being of a different size.

49. The power tool assembly of claim 48, wherein the handle assembly further includes
a first adapter attached to the first handle, and
a second adapter attached to the second handle, wherein the first and second adapters interchangeably attach the respective first and second handles to the housing.

50. The power tool assembly of claim 49, wherein the handle assembly further includes a third handle having a head portion with a third size for receiving a neck of a third power tool for supporting the third power tool in a side-by-side relationship with the dust collector, and wherein the necks of the first, second, and third power tools are of a different size.

51. The power tool assembly of claim 50, wherein the handle assembly further includes a third adapter attached to the third handle, and wherein the third adapter interchangeably attaches the third handle to the housing.

52. The power tool assembly of claim 49, wherein the housing includes a first side and an opposite second side, and wherein the first and second adapters are each interchangeably connectable to the first and second sides of the housing to thereby support one of the first and second power tools adjacent a chosen one of the first and second sides of the housing.

53. The power tool assembly of claim 49, wherein each of the first and second handles includes a cylindrical band and a rotatable grip for constricting and expanding the band, and wherein the necks of the first and second power tools are clamped by the respective bands.

54. The power tool assembly of claim 53, wherein the respective cylindrical bands of the first and second handles include different circumferential lengths.

55. The power tool assembly of claim 1, wherein the dust collector includes
a depth stop movable along the length of the suction pipe and selectively fixed to the suction pipe to limit the extent to which the suction pipe may telescope relative to the housing, and
a ruler coupled for movement with the depth stop.

56. The power tool assembly of claim 55, wherein the ruler includes a plurality of reference markings, and wherein a first of the markings is alignable with a reference datum on the housing to limit an extent to which the suction pipe telescopes into the housing to a first depth.

57. The power tool assembly of claim 56, wherein a second of the markings is alignable with the reference datum on the housing to limit the extent to which the suction pipe telescopes into the housing to a second depth.

58. The power tool assembly of claim 55, wherein the depth stop is engageable with the housing to limit the extent to which the suction pipe may telescope relative to the housing.

59. The power tool assembly of claim 1, further comprising a handle for directly supporting the power tool and the dust collector in a side-by-side relationship.

* * * * *